United States Patent
Terai

(10) Patent No.: US 7,428,379 B2
(45) Date of Patent: Sep. 23, 2008

(54) REPRODUCTION APPARATUS AND DISPLAY CONTROL METHOD

(75) Inventor: Takao Terai, Kanagawa (JP)

(73) Assignee: Sony Corporation, Tokyo (JP)

( * ) Notice: Subject to any disclaimer, the term of this patent is extended or adjusted under 35 U.S.C. 154(b) by 282 days.

(21) Appl. No.: 11/280,787

(22) Filed: Nov. 15, 2005

(65) Prior Publication Data

US 2006/0133795 A1    Jun. 22, 2006

(30) Foreign Application Priority Data

Nov. 15, 2004    (JP)    ............... P2004-330018

(51) Int. Cl.
    *G03B 15/03*    (2006.01)
(52) U.S. Cl. ..................... 396/159; 396/287
(58) Field of Classification Search ................ 396/287; 345/159

See application file for complete search history.

(56) References Cited

U.S. PATENT DOCUMENTS

| 5,530,455 | A | * | 6/1996 | Gillick et al. ............... 345/163 |
| 5,870,079 | A | * | 2/1999 | Hennessy .................... 345/159 |
| 6,512,527 | B1 | | 1/2003 | Barber et al. |
| 2003/0025878 | A1 | * | 2/2003 | Fredlund et al. ............... 352/1 |
| 2003/0221541 | A1 | * | 12/2003 | Platt ........................... 84/609 |

OTHER PUBLICATIONS http://web.archive.org/web/20020124174409/www.apple.com/iphoto/; Date of site Jan. 24, 2002.*
http://web.archive.org/web/20011212042319/www.apple.com/itunes/.*
http://web.archive.org/web/*/www.apple.com/itunes/.*
http://web.archive.org/web/*/www.apple.com/iphoto.*
http://web.archive.org/web/20020124174409/www.apple.com/iphoto/.*
http://web.archive.org/web/20011127160455/www.apple.com/itunes/theater/browse.html.*
http://web.archive.org/web/*/www.apple.com/iphoto/.*

* cited by examiner

*Primary Examiner*—W. B. Perkey
*Assistant Examiner*—Michael A Strieb
(74) *Attorney, Agent, or Firm*—Wofl, Greenfield & Sacks, P.C.

(57) ABSTRACT

Described is an image data reproduction apparatus including a reproduction section for reproducing image data from a recording medium. A display section shows the image data. An operation section gives a command for switching the display from a one frame image data display to a list image display. A control section executes list image display on the display section in response to the detection of an operation by the operation section when one piece of image data generated from the recording medium is displayed on the display section. The control section also moves a selection display on the list image display in response to the detection of an operation of the operation section.

A display control method is also described which includes the steps of: detecting an operation of the operation section; executing list image display by a display section; and moving the selection display on the list image display.

1 Claim, 16 Drawing Sheets

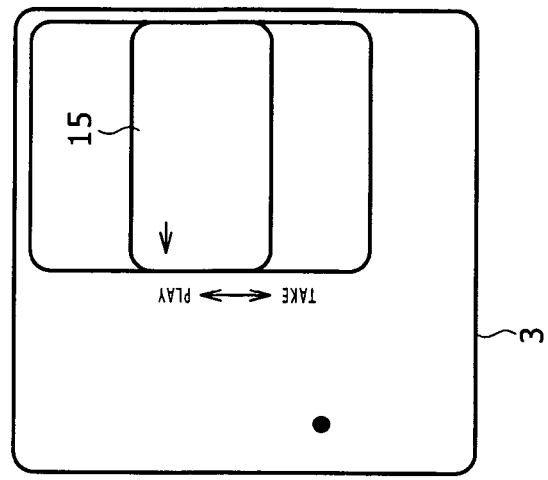
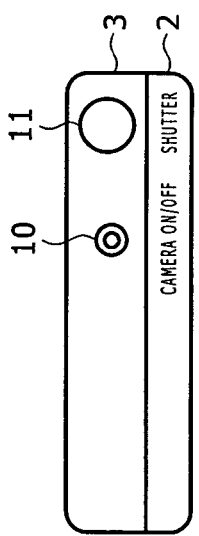
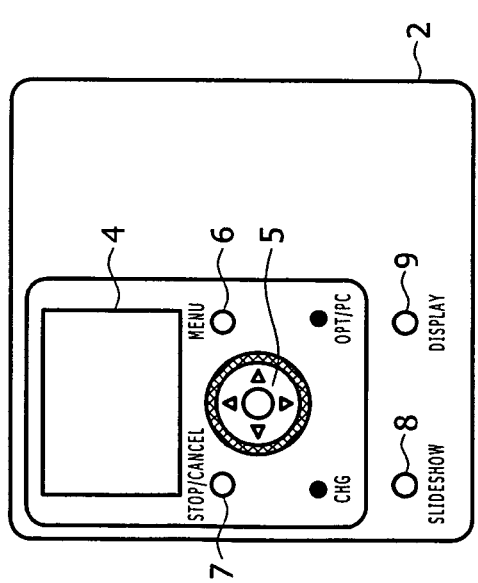
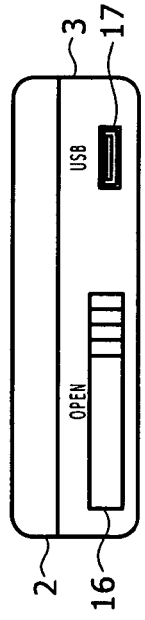
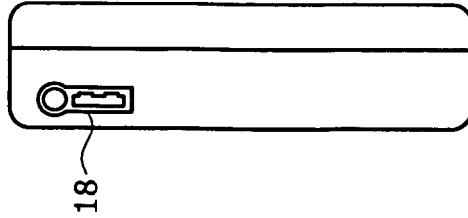

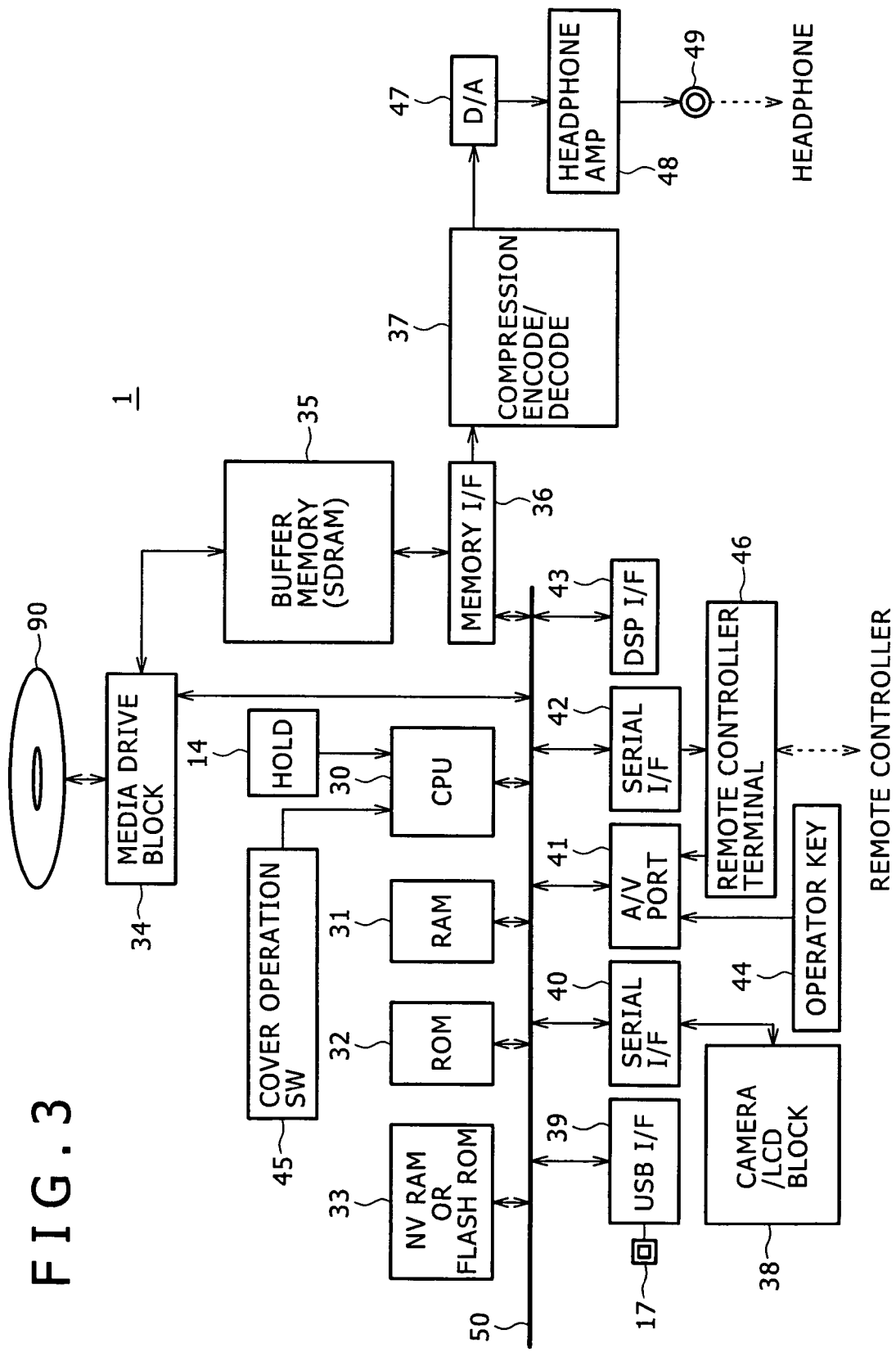

FIG.4A

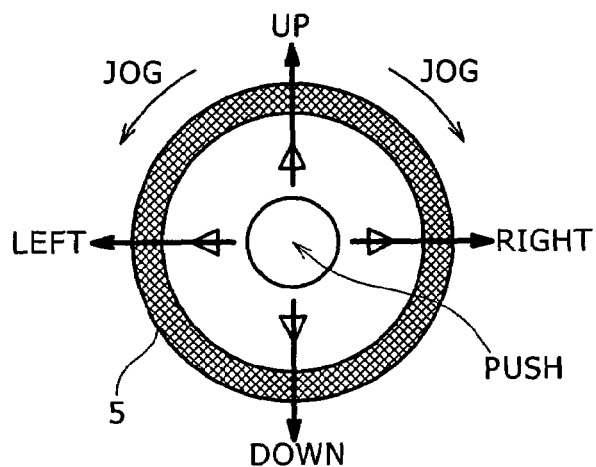

FIG.4B

|  | AUDIO MODE | CAMERA MODE |
|---|---|---|
| PUSH | PLAY/PAUSE<br>VARIOUS DETERMINATIONS<br>LONG PUSH SETS OR RESETS BOOKMARK | QUICK REVIEW<br>VARIOUS DETERMINATIONS |
| JOG | TRIGGER TRACK LIST<br>MOVE CURSOR | TRIGGER THUMBNAIL DISPLAY<br>MOVE CURSOR |
| LEFT | FR<br>REVIEW | SWITCH TO SELF TIMER<br>MOVE CURSOR |
| RIGHT | FF<br>CUE | SWITCH TO FLASH<br>MOVE CURSOR |
| UP | FOLDER+<br>MOVE CURSOR | SWITCH TO MACRO<br>MOVE CURSOR |
| DOWN | FOLDER-<br>MOVE CURSOR | SWITCH TO JACKET MODE PHOTO<br>SWITCH SIZE TO<br>1280x960 OR 640x480:<br>MOVE CURSOR |

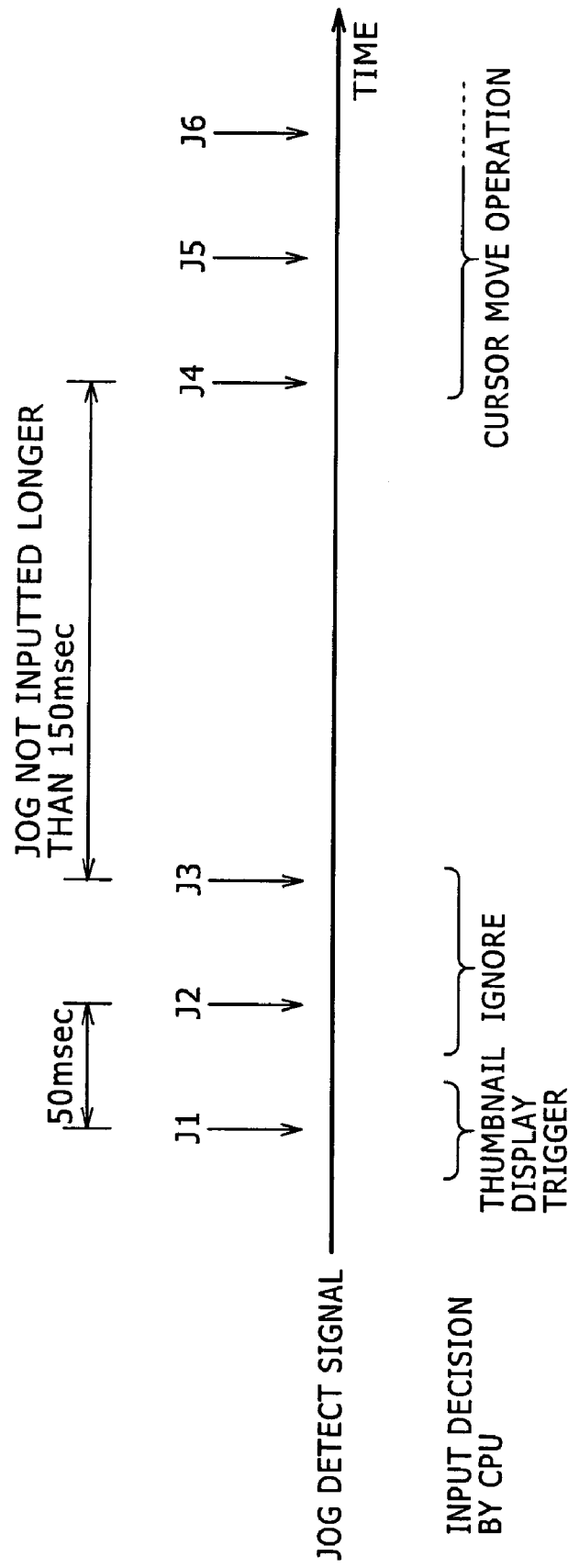

REPRODUCTION APPARATUS AND DISPLAY CONTROL METHOD

CROSS REFERENCES TO RELATED APPLICATIONS

The present invention claims priority under 35 U.S.C. §119(e) to Japanese Patent Application JP 2004-330018 filed in the Japanese Patent Office on Nov. 15, 2004, the entire contents of which being incorporated herein by reference.

BACKGROUND OF THE INVENTION

The present invention relates to an image data reproduction apparatus to be realized in the field of so-called digital still cameras for example and a display control method for this reproduction apparatus.

Digital still cameras are widespread in which an image signal of a photographic subject is obtained through a solid-state imaging device such as the CCD sensor or the CMOS sensor and the obtained image signal is recorded to a recording medium as imaged data. (Refer to Patent Document 1: Japanese Patent Laid-open No. 2002-333660.) These digital still cameras use, as recording media for recording imaged data (or photographic data), memory cards based on flash memories or disc media such as optical disc, magneto-optical disc, or hard disc (or magnetic disc). With currently general DCF-compliant digital cameras, image data are classified into folders on the FAT system to be recorded on these recording media.

SUMMARY OF THE INVENTION

With the recent rapid expansion in recording medium capacity, the amounts of imaged data that may be stored in recorded media are becoming huge.

Generally, digital still cameras are designed to display on a display monitor the imaged data captured and recorded on a recording medium. However, as the amounts of recorded imaged data increase, it becomes cumbersome for the user to perform operations for viewing desired taken images. For example, in viewing images, the user generally displays taken images by executing a feed forward (or backward) operation, frame by frame. However, it is difficult for the user to search huge amounts of imaged data for desired images by this procedure.

To aid the user in searching for desired images, a thumbnail approach is used for example in which many pieces of imaged data recorded on a recorded medium are listed in the form of so-called thumbnail images.

In the thumbnail approach, the user selects a desired thumbnail image from among a list of many thumbnail images and presses the enter key to display an imaged data represented by the selected thumbnail image, thereby facilitating search work for the user to execute.

Preferably, such a list display and cursor movements involved therein would be smoother and less frustrating for the user to execute.

It is also one of recent trends that more and more electronic devices become integrated with each other in function and the miniaturization of imaging devices as a component of the digital still camera and circuit configurations has been accelerating, resulting in the installation of the digital still camera on mobile phones, for example.

In this trend, some of portable players for reproducing audio data recorded on an optical disc for example have come to have camera capabilities.

With these combined portable devices having functions such as an audio player and a camera, proper operability and ease of operation of multiple functions plays an important role. Especially, the devices apply in the case of small-sized devices having controls each allocated with two or more functions because of the reduced size. However, even if such a case above, understanding of the operational function by a user should not be difficult.

Therefore, it is required to enhance ease of operation of camera devices in viewing images and ease of operation of audio devices having camera, for example.

It is therefore desirable for the present invention to realize the enhanced ease of operation and use in camera devices and reproducing devices realized in a camera device having audio reproducing capabilities.

In carrying out the invention and according to one embodiment thereof, there is provided a reproduction apparatus including: reproduction means for reproducing image data from a recording medium; display means for displaying image data reproduced by the reproduction means; operation means for giving a command for switching a display status in the display means from one frame image data display to list image display; and control means for executing list image display by the display means in response to the detection of an operation by the operation means when one piece of image data generated from the recording medium is displayed on the display means and moving selection display on list image display in response to the detection of an operation of the operation means.

For example, the above-mentioned operation means is a rotary control adapted to provide a rotary operation.

In the above-mentioned apparatus, the recording medium further stores audio data and the control means causes the reproduction means to reproduce image data on the recording medium in a first mode and reproduce audio data on the recording medium in a second mode wherein, if an operation of the control means is detected in the second mode, list display of audio data is executed by the display means and, in accordance with the detection of the operation of the operation means, selection display is moved on list display of audio data.

In the above-mentioned apparatus, if an operation of the operation means is detected when one piece of image data is displayed by the display means and list image display is executed by the display means and, if an operation of the operation means is detected a certain period after a time at which the operation was made by the operation means, the control means moves selection display on list image display.

In the above-mentioned apparatus, if an operation of the operation means is detected when one piece of image data is displayed by the display means and list image display is executed by the display means and, if an operation of the operation means is detected after a period in which no operation is detected for more than a predetermined time after the operation, the control means moves selection display on list image display.

In carrying out the invention and according to another embodiment thereof, there is provided a display control method for reproducing image data from a recording medium and displaying the image data onto a display means, including the steps of: detecting an operation of a operation means for giving a command for switching a display status in the display means from a display status in which one frame of image is displayed to a display status in which a list of images is displayed; executing list image display by the display means in response to the detection of an operation of the operation means when one piece of image data reproduced from the recording medium is displayed by the display means; and moving selection display on the list image display in response to the detection of an operation of the operation means when the list image display is executed by the display means.

In the above-mentioned method, the operation of the selection display moving step is executed if an operation of the operation means is detected a certain period after a time at which an operation of the operation means is executed to execute the list image display step.

In the above-mentioned method, the operation of the selection display moving step is executed if an operation of the operation means is detected after a period in which no operation has been detected for longer than a predetermined time for the operation means after the detection of an operation of the operation means for executing the list image display step.

As described above, while image data recorded by image-taking for example is reproduced and displayed on display means, list image display such as thumbnail display for example may be executed by operating operation means (such as a rotary control for example). In addition, if the operation of the above-mentioned control means is kept, display of selection (for example, cursor display) may be moved on display of list of images.

According to the present invention, the following advantages would be obtained for example.

When image data reproduced from a recording medium is displayed for viewing, operating the operation means (for example, a rotary control) allows list image display such as thumbnail display and keeping this operation moves selection display on list image display, thereby allowing the user to execute switching to list image display and image selection (or cursor movement) on list image display by a single operation. In the case of a rotary control, for example, a rotation operation thereof allows the user to continuously execute a sequence of rotary operations necessary for cursor movement. This novel configuration makes it easier for the user to search for desired images.

In addition, if an audio reproduction function is provided, the operation of the above-mentioned operation means (for example, a rotary control) may be made a trigger for the list display of audio data and an operation for moving selection (or cursor movement) on the list display. Consequently, the operation of the above-mentioned operation means provides a similar operation in meaning in both a first mode (or the camera mode) and a second mode (or the audio mode), which makes easier for the user to understand operational functions, thereby enhancing ease of operation. Besides, because the above-mentioned operation means is shared in function by both the first and second modes, the number of controls may be reduced on the combined function apparatuses such as the embodiment herein, which in turn reduces operator load, making the embodiment preferable for the application to small-size portable devices.

If an operation of the above-mentioned operation means is detected while one piece of data is displayed and list image display is executed and then an operation of the above-mentioned operation means is detected a predetermined period after the time of that operation, the above-mentioned control means moves selection display (or the cursor) on list image display. Alternatively, if an operation of the above-mentioned operation means is detected and list image display is executed and, after a predetermined period in which on operation has been detected for the above-mentioned operation means after that operation, the above-mentioned control means moves selection display (or the cursor) on list image display.

Namely, if switching is made to list image display, an operation of the operation means is handled as an operation of moving selection display under the condition that there is a period in which no operation has been detected for longer than predetermined time, thereby preventing any cursor movement unexpected by the user to further enhance ease of operation. For example, in the case of a rotary control, the user may be prevented from rotating the control too much, resulting in the movement of the cursor upon switching to list image display.

BRIEF DESCRIPTION OF THE DRAWINGS

FIGS. 1A, 1B, 1C, 1D, 1E and 1F are a front view, a top view, a left side view, a right side view, a bottom view, and a rear view of an audio camera combined apparatus practiced as one embodiment of the invention;

FIG. 3 is a block diagram illustrating the audio camera combined apparatus of the above-mentioned embodiment;

FIGS. 4A and 4B are diagrams illustrating operational functions of a central controller of the above-mentioned embodiment;

FIG. 16 is a diagram illustrating operation example III in photograph viewing status of the above-mentioned embodiment.

DETAILED DESCRIPTION OF THE PREFERRED EMBODIMENTS

Figure 2A:
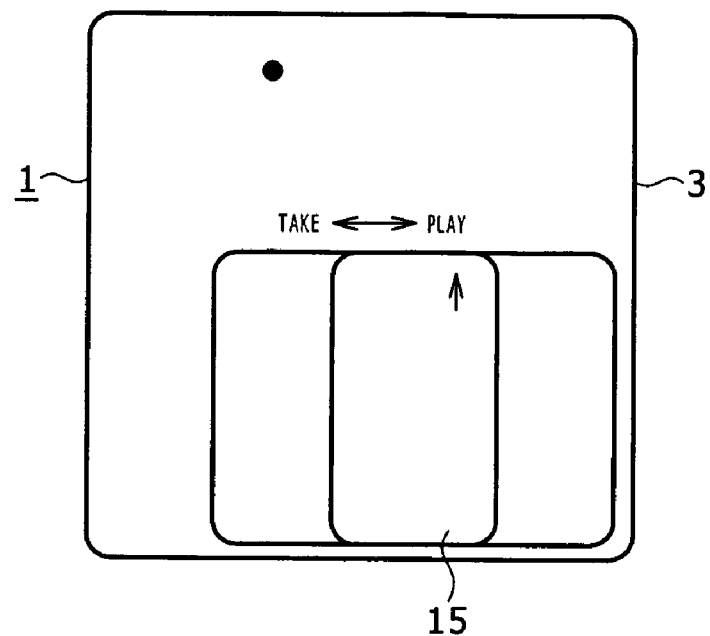
FIGS. 2A and 2B are schematic diagrams illustrating close and open statuses of a lens cover of the above-mentioned embodiment.

The following describes an apparatus having portable audio player and camera capabilities, practiced as one embodiment of a reproduction apparatus and a display control method according to the present invention. The audio player and camera combined apparatus of the present embodiment is capable of reproducing audio data with an optical disc used as a recording medium and recording and reproducing taken still image data (or imaged data) to and from the optical disc. The description will be made in the following order:

1. An external configuration of the audio player and camera combined apparatus;
2. An internal configuration of the audio player and camera combined apparatus;
3. Operational functions of a central controller;
4. Operation status transitions;
5. File management forms;
6. Operations in stop status;
7. Operations in reproduction status;
8. Operation example I in photograph viewing status;
9. Operation example II in photograph viewing status;
10. Operation example III in photograph viewing status; and
11. Effects of and variations to the embodiment.

1. An External Configuration of the Audio Player and Camera Combined Apparatus

FIGS. 1A, 1B, 1C, 1D, 1E, and 1F show a front view, a top view, a left side view, a right side view, a bottom view, and a rear view of an audio player and camera combined apparatus 1 of the present embodiment.

A housing of the audio player and camera combined apparatus 1 is made up an upper housing 2 and a lower housing 3, the upper housing 2 being fixed to the lower housing in a freely open/close manner. Although the description of detail mechanism is skipped, operating an open slide 16 shown in FIG. 1E opens the upper housing 2 relative to the lower housing 3 to expose a disc loader of a so-called mini disc type. Closing the upper housing 2 with a disc loaded starts recording or reproducing information to or from the loaded disc inside the housing.

When a disc is loaded, the audio player and camera combined apparatus 1 is capable of reproducing audio data (music for example) recorded to the loaded disc, thereby functioning as a portable audio player. Also, the apparatus functions as a digital still camera by recording and reproducing imaged data to and from the loaded disc.

In what follows, an operation status in which the audio player and camera combined apparatus 1 functions as an audio player is referred to as an audio mode and an operation status in which this apparatus functions as a digital still camera is referred to as a camera mode.

On the front side of the housing, a display block 4 made up of a liquid crystal display for example is arranged as shown in FIG. 1A. In the audio mode, the display block 4 displays a list of audio data recorded to the loaded optical disc, an operation menu, a track number being reproduced, such time information as elapsed time and total play time, an operation guide, an album jacket image, a slide show image, and a thumbnail image, for example.

In the camera mode and in an imaging standby status, the display block 4 displays a subject image (or an actually moving image) being taken by the imaging device and a still image (or a photographic image) taken at the time of a shutter operation and, in a photograph viewing status, a reproduced image and a thumbnail image of photographs (or the imaged data recorded to the loaded optical disc) taken in the past.

Various controls are arranged at predetermined positions on the housing.

As shown in FIG. 1A, these controls include a central controller 5, a menu key 6, a stop/cancel key 7, a slide show key 8, and a display key 9. As shown in FIG. 1B, a camera-on/off key 10 and a shutter button 11 are arranged on the housing. As shown in FIG. 1D, a volume key 12, a download key 13, and a hold switch 14 are arranged on one side of the housing.

The central controller 5 is the control to be operated for main operations in both the audio and camera modes. The functions of the central controller 5 will be described in detail later with reference to FIG. 4.

The menu key 6 is used to turn on/off the displaying of an operation menu on the display block 4.

The stop/cancel key 7 is used to stop a reproducing operation and executes various cancel operations.

The slide show key 8 is used to start displaying image data at the time of audio reproduction for example as a slide show.

The display key 9 is used to switch between display modes and display contents on the display block 4.

The camera on/off key 10 is used to turn on/off the camera mode, which will also be described later.

The shutter button 11 is pressed to give the timing of imaging in the camera mode. Pressing the shutter button 11 takes a photographic image.

The volume key 12 control the volume of sound at the time of audio reproduction.

The download key 13 is used to download data when the audio player and camera combined apparatus 1 is connected to a personal computer, for example.

The hold switch 14 is a slide control for setting the invalidation (or the hold status) of each control key in order to prevent error operation when this apparatus is being carried.

A USB terminal 17, a USB interface, is arranged on the bottom side of the housing as shown in FIG. 1E, thereby allowing the connection to a personal computer for example.

A headphone/remote control terminal 18 is arranged on one side of the housing as shown in FIG. 1C to which a headphone with a remote controller is connected.

A battery box lid 19 is arranged on one side of the housing as shown in FIG. 1D. Opening the battery box lid 19 allows loading and unloading of battery.

A lens cover 15 which is slidable is arranged on the rear of the housing as shown in FIG. 1F. The lens cover 15 is provided to protect the imaging lens.

Figure 2B:
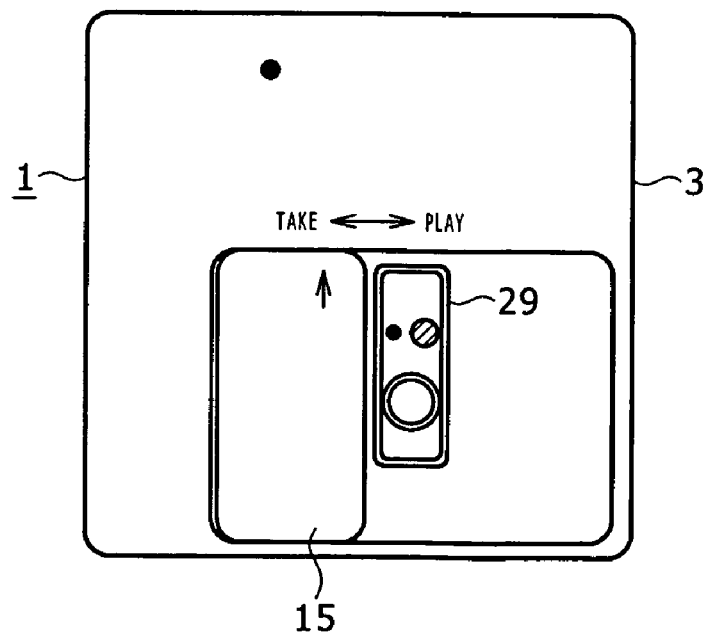

FIGS. 2A and 2B show statuses of opening and closing the lens cover 15 in a sliding manner.

The lens cover 15 is slid to close as shown in FIG. 2A and slid to open as shown in FIG. 2B. In the open status shown in FIG. 2B, the imaging lens block 29 is exposed to make camera imaging ready. In the close status shown in FIG. 2A, the imaging lens block 29 is covered to protect the lens.

In the present embodiment, sliding the lens cover 15 also gives an instruction for operation status transition.

2. Internal Configuration of the Audio Player and Camera Combined Apparatus

The following describes an internal configuration of the audio player and camera combined apparatus 1 with reference to FIG. 3.

A CPU 30 functions as a control block for the entire apparatus, executing control on a reproducing operation in the audio mode, an imaging operation and an image reproducing operation in the camera mode, a display operation of the display block 4, detection of a user operation, operation status transition processing, and communication with external devices, for example. The CPU 30 transfers data and control information with other components via a bus 50.

A RAM 31 is used as a work area for the CPU 30 and a storage area for information during execution.

A ROM 32 stores programs to be executed by the CPU 30 and various processing coefficients.

A nonvolatile memory 33 (an NV-RAM or a flash ROM) is used to store such information to be also retained when power is off as various coefficients, setting information, and resume points (or addresses at which reproduction stopped), for example.

A media drive block 34 executes recording and reproduction of data on a disc 90, an optical disc (or a magneto-optical disc) based on mini disc for example, under the control of the CPU 30. Therefore, the media drive block 34 has an encode block for encoding data to be recorded to the disc 90 into a recording format, a decode block for decoding reproduction data from the disc 90, a recording/reproducing head, a servo mechanism, and a spindle motor mechanism, for example.

A buffer memory 35, made up of an SD-RAM for example, buffers data to be recorded to the disc 90 by transferring the data to the media drive block 34 and data read from the disc 90 through the media drive block 34.

When the disc 90 is loaded, management information recorded to the disc 90, namely the physical information of the disc 90, the area information, and the information about recorded data files necessary for the recording and reproduction of data are read by the media drive block 34 as instructed by the CPU 30. These pieces of management information are stored in a part of the buffer memory 35 for the reference by the CPU 30. It should be noted that the CPU 30 may reference the management information stored in the buffer memory 35 by loading the management information from the buffer memory 35 to the RAM 31.

A memory interface 36 executes processing of transferring data to be stored in the buffer memory 35 and control of read/write addresses in the buffer memory.

A compression encode/decode block 37 compressively encodes audio data and decodes compressed audio data by a data compression algorithm such as ATARC.

Encoded audio data is decoded by the compression encode/decode block 37 into linear PCM data for example, which is then converted by a D/A converter 47 into an analog audio signal to be supplied to a headphone amplifier 48. The headphone amplifier 48 executes amplification and impedance control processing on the supplied analog audio signal and supplies the processing signal to a headphone terminal 49.

The headphone terminal 49 is a headphone terminal part of the headphone/remote control terminal 18 shown in FIG. 1C, through which reproduced sound is outputted from a connected headphone having a remote controller.

Although not shown, if analog audio signal or digital audio data is inputted through an input system such as line input, microphone input, or digital audio input, the inputted audio signal is supplied to the compression encode/decode block 37 in the form of digital audio data for example to be compressively encoded. Then, the compressed audio data is transferred to the media drive block 34 via the buffer memory 35 to be recorded to the disc 90, thereby realizing audio recording capabilities.

Also, if audio data is downloaded to the present apparatus connected to a personal computer for example, the audio data may be sometimes compressively encoded by the compression encode/decode block 37.

A USB interface 39 executes the processing of transferring data with devices such as a personal computer for example connected via a USB terminal 17.

A serial interface 40 executes the processing of inputting/outputting data with a camera/LCD block to be described later.

An A/D port 41 detects various user operations and supplies A/D conversion values to the CPU 30 as operational information. An operator key 44 is indicative of any of the above-mentioned central controller 5, menu key 6, stop/cancel key 7, slide show key 8, display key 9, camera on/off key 10, shutter button 11, volume key 12, and download key 13. The A/D port 41 transmits operational information of these controls to the CPU 30 in predetermined values.

A remote control terminal 46 is the remote control terminal part of the headphone/remote control terminal 18 shown in FIG. 1C, by which the operational information from the remote controller arranged on the connected headphone is detected by the A/D port 41 to be transmitted to the CPU 30 as a predetermined value.

A serial interface 42 supplies the display data specified by the CPU 30 from the remote control terminal 46 to the remote controller. The remote controller arranged on the headphone has a display section, on which a display operation is executed in accordance with the display control information supplied from the CPU 30 via the serial interface 42.

A DSP interface 43 transfers data and control information between components such as the CPU 30 and the USB interface 39 on the bus 50 and the compression encode/decode block 37.

An operation of the hold switch 14 is detected by the CPU 30. If a key invalidation is effected by the hold switch 14, the operational information caused by the operator key 44 that is supplied via the A/D port 41 is handled as invalid information.

A cover cooperation switch 45 is turned on/off in accordance with the open/close status of the lens cover 15, thereby functioning as a detector of the open/close of the lens cover 15. Detecting on/off of the cover cooperation switch 45, the CPU 30 recognizes whether the lens cover 15 is in the open or close status.

A camera/LCD block 38 functions as an image processor and a display section having the display block 4.

In the image processing function, the camera/LCD block 38 has a solid-state imaging device such as a CCD sensor or a CMOS sensor for sensing the image of a subject entered through the imaging lens block 29, an image signal transfer circuit for transferring an image signal supplied from the solid-state imaging device to execute gain control and A/D conversion, a digital processor for executing white balance and Y/C processing on the taken image data obtained by the image signal transfer circuit, and an encoder for executing compression and formatting on the taken image data.

In the display function, the camera/LCD block 38 has a display image processor for forming images, letters, and characters for example to be displayed on the LCD that is the display block 4 and a display driver for driving the LCD in accordance with display images.

The audio player and camera combined apparatus 1 thus described reproduces the audio data recorded to the disc 90 in the audio mode.

When the user executes a reproduction operation by use of the operator key 44 or the remote controller, the CPU 30 controls the media drive block 34 to execute the reproduction of an audio file (or an audio track) recorded on the disc 90.

The audio data reproduced by the media drive block 34 is accumulated in the buffer memory 35 to be sequentially read into the compression encode/decode block 37 to be decoded. The decoded data is then converted by the D/A converter 47 into an analog audio signal to be outputted as sound from the connected headphone through the headphone amplifier 48.

In the audio mode, the display block 4 and the display processor in the camera/LCD block 38 execute operations of displaying a reproduction menu (displaying a list of music titles for example), the music title, artist name, time information, jacket image, and slide show image of the music being reproduced under the control of the CPU 30.

In the camera mode and in the imaging standby status, the CPU 30 controls the camera/LCD block 38 to capture a subject image, execute image signal processing, and displaying the captured subject image (or an actual moving image) on the display block 4.

When the user presses the shutter button 11 in this status, the CPU 30 executes control so that a subject image (or a still image) at that moment is recorded as imaged data. Namely, one frame of image data at the time of a shutter operation is supplied to the media drive block 34 via the buffer memory 35 as recorded data.

The media drive block 34 records the imaged data to the disc 90 as one photographic image file.

In the photograph viewing status in the camera mode, the CPU 30 reads data of a photographic image file recorded to the disc 90 into the media drive block 34. The read image data is transferred to the camera/LCD block 38 via the buffer memory 35 to be displayed on the display block 4.

It should be noted that photographic image data is displayed on the display block 4 frame by frame or in a list of many images as thumbnails. In accordance with a user operation, the CPU 30 displays photographic image data on a frame basis or on a thumbnail basis.

3. Operational Functions of a Central Controller

The following describes operational functions of the central controller 5 with reference to FIG. 4. The central controller 5 is a shared control to which the operator functions in both the camera mode and audio mode are allocated.

FIG. 4A shows how the central controller 5 is operated.

The central controller 5 first may be pressed in the central position thereof.

Next, the central controller 5 may also be pressed in any of the four positions around the center, corresponding to up and down and left and right operations.

In addition, the central controller 5 is rotatively formed in the external periphery thereof, thereby providing a jog dial that may be rotated clockwise and counterclockwise.

The above-mentioned functions of the central controller 5 are shown in FIG. 4B.

First, the operational functions in the audio mode will be described.

A push operation causes reproduction and pause operations, an enter operation, and a bookmark setting/clear operation.

For example, when a push operation is executed with the present apparatus kept in a sleep status where the power is off or a stop status, the CPU 30 recognizes the push operation as a command for starting a reproducing operation, thereby starting reproduction start control. In this case, if a track (or a data file containing music data) is selected on a menu screen for example, the CPU 30 starts reproducing the selected track; if no track is selected, the CPU 30 starts reproducing a first track recorded to the disc 90. If a particular address is stored as a resume point, the CPU 30 starts reproducing the disc 90 from that resume point.

If a push operation is executed while a reproducing operation is being executed, the CPU 30 recognizes the push operation as a command for a pause, thereby pausing the output of reproduced sound.

If a push operation is executed while a selection operation with the cursor is being executed in operation menu display on the display block 4 for example, then the CPU 30 recognizes the push operation as a command for enter, thereby entering a specified determination.

If a push operation is executed for longer than a predetermined time, two seconds for example, the CPU 30 recognizes the long push as a command for a bookmark setting, thereby executing bookmarking of the reproducing position. If a long push operation is executed at a bookmarked position, the CPU 30 recognizes the long push operation as a command for clearing the bookmark.

A jog operation triggers track list display or a cursor move operation.

For example, when the user executes a job operation, the CPU 30 displays a track list on the display block 4. Further, a continuous jog operation causes a cursor move operation on the track list display. For example, if a piece of music for reproduction is to be selected, the user may select the desired piece of music by executing a jog operation. The user moves the cursor to the desired music title on the track list display and executes a push operation to enter the selection, upon which the selected title is reproduced.

A left push operation triggers an FR (Feed Reverse) operation and a review (fast reverse play) operation. Namely, a short left push operation triggers an access to a track start position in the reverse direction and a long left push operation triggers a fast reproduction in the reverse direction.

A right push operation triggers an FF (Feed Forward) operation and a cue (fast reproduction) operation. Namely, a short right push operation triggers an access to a track start position in the feed forward direction and a long right push operation triggers a fast feed operation.

An up push operation triggers a folder move operation (or a folder jump operation) and a cursor move operation in the + direction. On the disc 90, many audio tracks (or audio files) are recorded in a folder or folders. Some up push operation results in a movement of tracks on a folder basis.

If menu display or track list display is on, an up push operation triggers a cursor movement in the up direction.

A down push operation triggers a folder move operation (or a folder jump operation) and a cursor move operation in the − direction. Some down push operation results in a movement of tracks on a folder basis but in the direction reverse to that of the up push operation and a cursor movement in the down direction on menu display and track list display.

In the camera mode, the following operational functions are executed.

A push operation triggers a quick review operation and an enter operation for various determinations.

For example, if a push operation is executed after an imaging operation is executed in the standby status, the CPU 30 recognizes the push operation as a command for a quick review operation, thereby executing the displaying of image data taken last and recorded to the disc 90. If a push operation is executed during display of thumbnail images, the CPU 30 recognizes this push operation as a command for entering the selection of a thumbnail image selected by the cursor, thereby displaying one frame of that image data.

If a push operation is executed while a selection operation is being executed with the cursor in the operation menu display on the display block 4 for example, the CPU 30 recognizes this push operation as a command for entering the selection, thereby executing a corresponding enter operation.

A jog operation triggers a thumbnail display operation and a cursor move operation.

For example, if a jog operation is executed with one frame of photographic image data displayed on the display block 4 in the photography viewing status, the CPU 30 recognizes the jog operation as a command for triggering thumbnail display (or list image display), thereby executing control of displaying thumbnail images on the display block 4.

Further, a continuous jog operation triggers a cursor move operation on the thumbnail display. For example, the user may select a desired image by executing a jog operation. Moving the cursor to the corresponding thumbnail image, the user executes a push operation to enter the selection, upon which one frame of the selected image is displayed.

With menu display on, a jog operation triggers a cursor move operation in the rotational direction indicated by the jog operation.

A left push operation triggers a self timer switching operation and a cursor move operation. Namely, a left push operation switches between self timer functions and moves the cursor to the left when thumbnail images are displayed.

A right push operation triggers a flash switching operation and a cursor move operation. Namely, a right push operation switches between flash functions and moves the cursor to the right when thumbnail images are displayed.

An up push operation triggers a macro switching operation, a cursor move operation, and a folder move operation (or a folder jump operation) in the + direction. Namely, an up push operation switches between macro functions, and moves up the cursor when thumbnail images are displayed. On the disc 90, many files as image data are recorded in a folder or folders. Some up push operation results in a movement of files on a folder basis. For example, if an up push operation is executed when one frame of image data is displayed, this becomes a folder jump operation in which a current image data folder containing the image data being displayed is switched to a next image data folder.

A down push operation triggers a jacket photograph mode switching, an image size switching operation, a cursor move operation, and a folder move operation (or a folder jump operation) in the − direction. Namely, a down push operation switches between jacket photograph modes and switches between image sizes 1280×960, 640×480, and so on. When thumbnail images are displayed, the cursor is moved down. When one frame of image data is displayed, switching is made to a status in which a previous image data folder is specified.

4. Operation Status Transitions

In the present embodiment, an operation of opening/closing the lens cover 15 is used as an operation for a variety of operation status transitions in the audio player and camera combined apparatus. The following describes transitions of operation status including the open/close of the lens cover 15 with reference to FIG. 5.

In the present embodiment, the operation statuses are largely classified into the audio mode and the camera mode.

The audio mode includes a sleep status, a stop, status, and a reproduction status.

The camera mode includes an imaging standby status and a photograph viewing status.

In the sleep status, the main power to the present apparatus is off. In this status, a sleep power is supplied to the CPU 30, thereby executing only a minimum necessary processing, such as the detection of a user operation and a clock counting operation.

In the stop status, the main power to the present embodiment is on but no audio reproduction is being executed.

In the reproduction status, audio reproduction is on or in a pause status.

In the imaging standby status, an image of a subject is displayed on the display block 4 and is ready to be taken (or recorded) by pressing the shutter button 11.

In the photograph viewing status, the taken image data recorded to the disc 90 is reproduced and displayed in one frame or thumbnail display on the display block 4.

Figure 5:
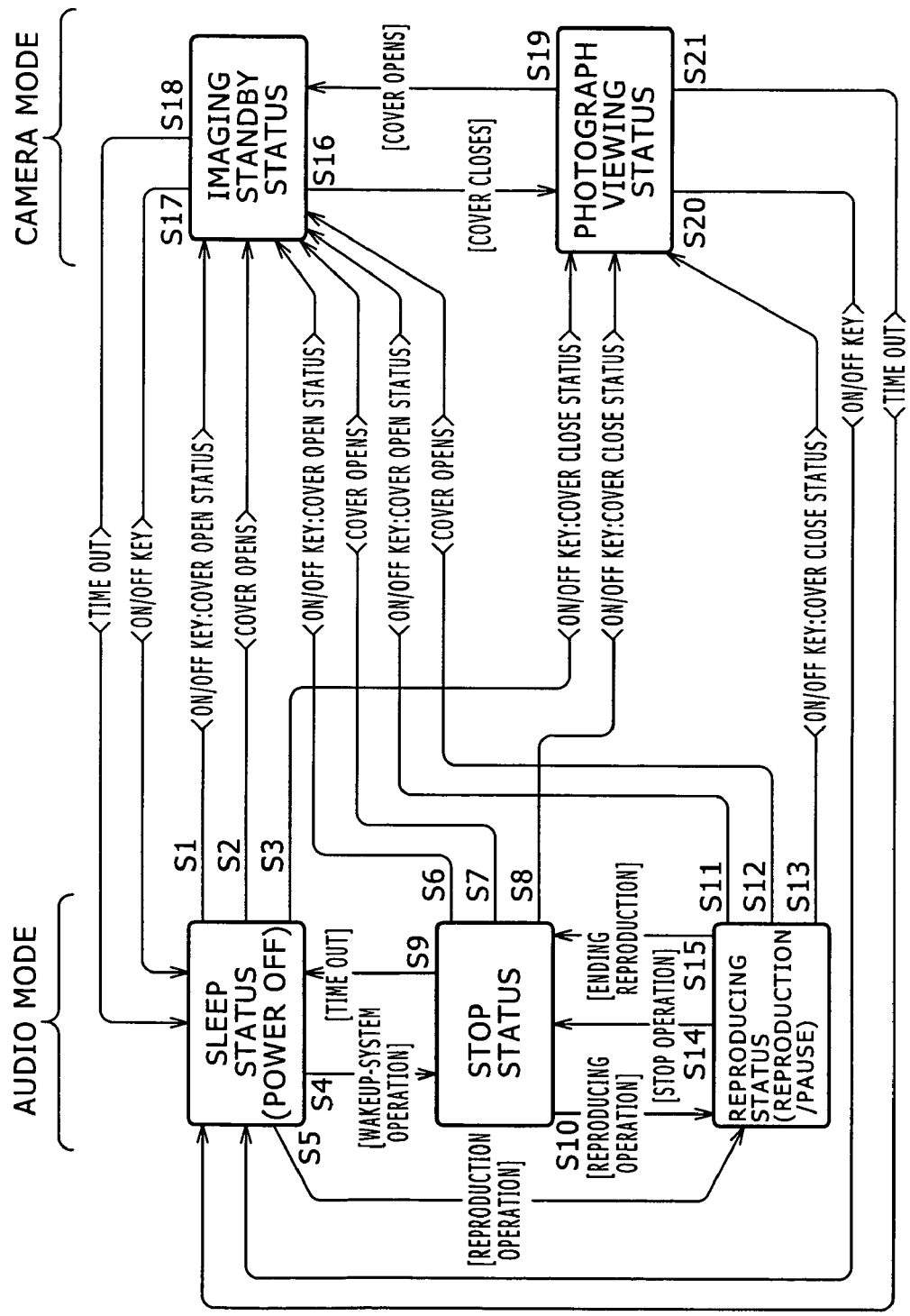
FIG. 5 is a diagram illustrating an operational transition of the above-mentioned embodiment.

The CPU 30 switches between the above-mentioned operation statuses (or operation modes) in accordance with operations or conditions indicated in S1 through S21 shown in FIG. 5.

S1: Operating the Camera On/Off Key 10 in the Sleep Status

When the camera on/off key 10 is operated in the sleep status, the CPU 30 starts up the camera mode. However, if the lens cover 15 is in the open status when the camera on/off key 10 is operated, then the CPU 30 starts up the camera mode in the imaging standby status.

S2: Opening the Lens Cover 15 in the Sleep Status

When the lens cover 15 is opened in the sleep status, the CPU 30 starts up the camera mode to enter the imaging standby status.

S3: Operating the Camera On/Off Key 10 in the Sleep Status

When the camera on/off key 10 is operated in the sleep status as described above in S1, the CPU 30 starts up the camera mode; however, if the lens cover 15 is in the closed status when the camera on/off key 10 is operated, then the CPU 30 starts up the camera mode in the photograph viewing status.

S4: Operating the Wakeup System from the Sleep Status

When the wakeup system is operated in the sleep mode, the CPU 30 turns on the main power in the audio mode, entering the stop status. A wakeup system operation denotes an operation that involves no reproducing operation based on the menu key 6 or the display key 9.

S5: Reproducing Operation in the Sleep Status

If the central controller is pushed in the sleep status, or a reproducing operation is executed in the sleep status, the CPU 30 turns on the main power in the audio mode, thereby entering the reproduction status; namely, the CPU 30 starts up a reproducing operation.

S6: Operating the Camera On/Off Key 10 in the Stop Status

When the camera on/off key 10 is operated in the stop mode, the CPU 30 switches the audio mode to the camera mode. However, if the lens cover 15 is open when the camera on/off key 10 is operated, the CPU 30 starts up the camera mode in the imaging standby status.

S7: Opening the Lens Cover 15 in the Stop Status

When the lens cover 15 is opened in the stop status, the CPU 30 switches to the camera mode to enter the imaging standby status.

S8: Operating the Camera On/Off Key 10 in the Stop Status

If the camera on/off key 10 is operated in the stop mode as described above with S6, the CPU 30 ends the audio mode to start up the camera mode. If the lens cover 15 is in the closed status when the camera on/off key 10 is operated, the CPU 30 starts up the camera mode in the photograph viewing status.

S9: Time-Out in the Stop Status

If a predetermined time (three minutes for example) has passed without any operation by the user in the stop status, then the CPU 30 determines it as a time-out and turns off the main power, thereby entering the sleep status.

S10: Reproducing Operation from the Stop Status

If the central controller is pushed, or a reproducing operation is executed, in the stop status, the CPU 30 switches to the reproduction status, or starts up a reproducing operation.

S11: Operating the Camera On/Off Key 10 in the Reproduction Status

If the camera on/off key 10 is operated in the reproduction status, the CPU 30 stops reproduction and switches the audio mode to the camera mode. However, if the lens cover 15 is in the open status when the camera on/off key 10 is operated, the CPU 30 starts up the camera mode in the imaging standby status.

S12: Opening the Lens Cover 15 in the Reproduction Status

If the lens cover 15 is opened in the reproduction status, the CPU 30 stops reproduction and switches to the camera mode, thereby entering the imaging standby status.

S13: Operating the Camera On/Off Key 10 in the Reproduction Status

If the camera on/off key 10 is operated in the reproduction status as described above with S11, the CPU 30 ends the audio mode to start up the camera mode. However, if the lens cover 15 is in the close status when the camera on/off key 10 is operated, the CPU 30 starts up the camera mode in the photograph viewing status.

S14: Stopping in the Reproduction Status

If the stop/cancel key 7 is operated in the reproduction status, the CPU 30 ends reproduction, entering the stop status.

S15: Ending Reproduction

When the reproduction of audio data has been completed, the CPU 30 switches to the stop status.

S16: Closing the Lens Cover 15 in the Imaging Standby Status

If the lens cover 15 is closed in the imaging standby status, the CPU 30 switches to the photograph viewing status.

S17: Operating the Camera On/Off Key 10 in the Imaging Standby Status

If the camera on/off key 10 is operated in the imaging standby status, the CPU 30 ends the camera mode and turns off the main power, thereby entering the sleep status.

S18: Time-Out in the Imaging Standby Status

If a predetermined time (three minutes for example) has passed without any operation by the user in the imaging standby status, the CPU 30 determines a time-out and turns off the main power, thereby entering the sleep status.

S19: Opening the Lens Cover 15 in the Photograph Viewing Status

If the lens cover 15 is opened in the photograph viewing status, the CPU 30 enters the imaging standby status.

S20: Operating the Camera On/Off Key 10 in the Photograph Viewing Status

If the camera on/off key 10 is operated in the photograph viewing status, the CPU 30 ends the camera mode and turns off the main power, thereby entering the sleep status.

S21: Time-Out in the Photograph Viewing Mode

If a predetermined time (three minutes for example) has passed without any operation by the user in the photograph viewing mode, the CPU 30 determines a time-out and turns off the main power, thereby entering the sleep status.

Thus, the CPU 30 switches between operation statuses in accordance with user operations and conditions.

5. File Management Forms

The following describes forms in which image data and audio data to be recorded on the disc 90 are managed.

On the disc 90, recorded dada is managed by a FAT file system, for example.

Figure 6:
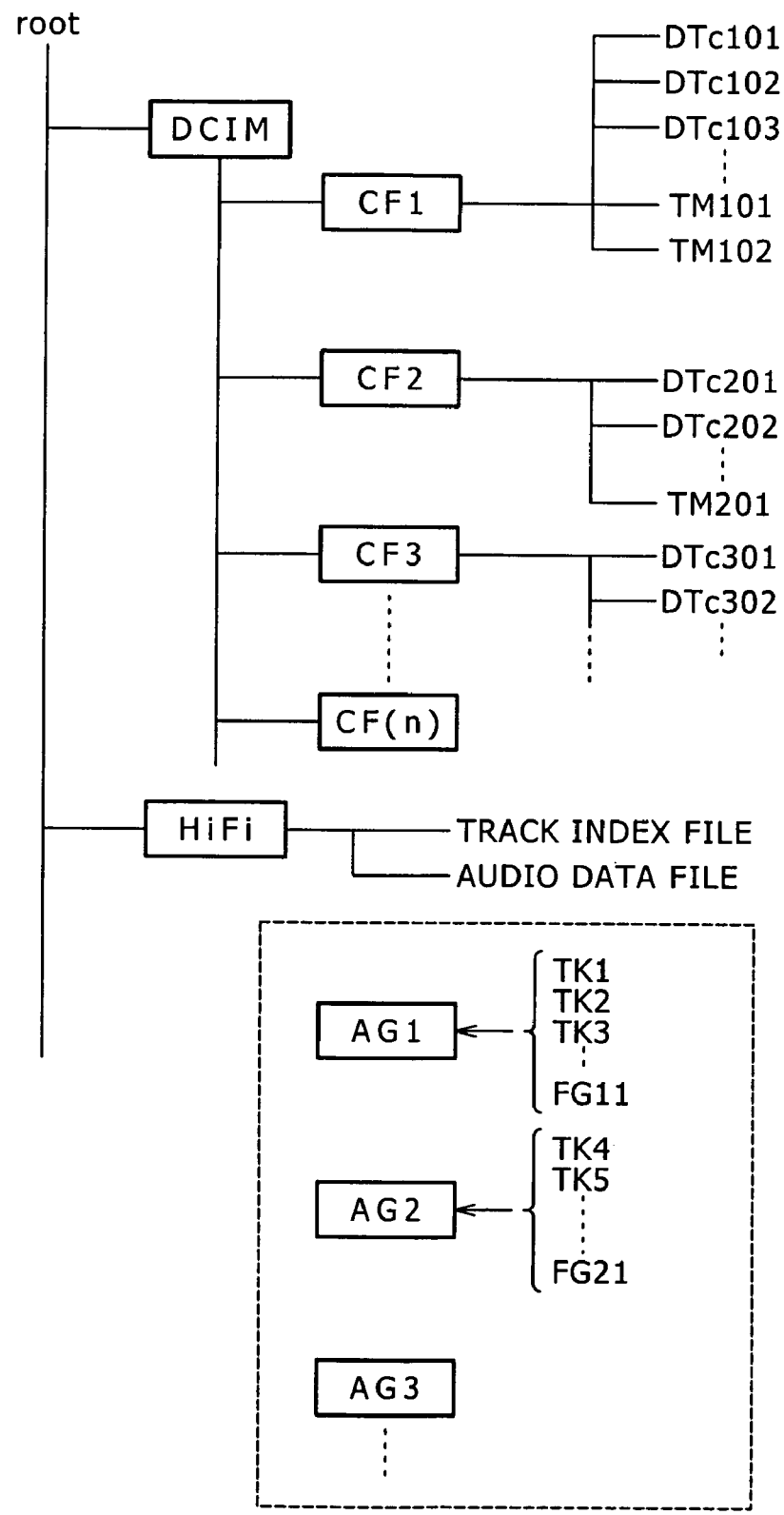
FIG. 6 is a diagram illustrating a file management form of the above-mentioned embodiment.

As shown in FIG. 6, a DCIM directory and a HiFi directory are arranged at the root of the FAT file system.

Each still image (or each piece of imaged data) in digital cameras is generally managed in compliance with JEIDA-based camera file system standard DCF (Design rule for Camera File system). This DCF system specifies to arrange a DCIM directory at the root.

The DCIM directory may contain a maximum of 999 folders CF1, CF2, and so on. For the purpose of description, folders CF1, CF2, and so on in the DCIM directory are referred to as "image data folders."

Each image data folder CF may contain a maximum of 9999 still images (or 9999 pieces of imaged data), the maximum number of still pictures depending on the design of each model of camera (as long as the number is 9999 or less).

In FIG. 6, the imaged data files contained in image data folder CF1 is indicated as DTc101, DTc102, and so on.

Each file also contains header information and thumbnail data in addition to actual imaged data. Further, one or more thumbnail files containing thumbnail dada are generated and arranged in image data folder CF1. Files TM101 and TM102 are indicative of thumbnail files. One thumbnail file is adapted to store a maximum of 100 thumbnail images, for example.

Each of other image folders CF2, CF3, and so on has the same structure as image data folder CF1.

Depending on the HiFi directory, audio data is managed as a mini disc system. In this HiFi directory, a track index file and an audio data file are arranged.

The audio data file contains tracks as actual audio data and various kinds of fringe information, these actual pieces of audio data being managed by the management information in the track index file.

The description of details of a management structure of the track index file is skipped. Basically, the tracks that are many pieces of audio data are managed in one or more groups. There are an album group, an artist group, and a group set by the user, for example. For example, a management structure is formed as groups AG1, AG2, and so on, each of the groups containing one or more tracks and fringe information. FIG. 6 shows that group AG1 contains tracks TK1, TK2, TK3 and fringe information FG1, for example.

For the purpose of description, groups AG1, AG2, and so on are hereafter referred to as "audio data folders" to make a distinction from the above-mentioned image data folder.

It should be noted that, the present embodiment uses a mini disc system for example, so that the management form by a track index file does not have a folder structure in which audio data is directly stored. It may also be practicable to use a form in which a certain directory under the root points at a plurality of audio data folders, each thereof containing one or more audio data files (or tracks).

6. Operations in Stop Status

Figure 7:
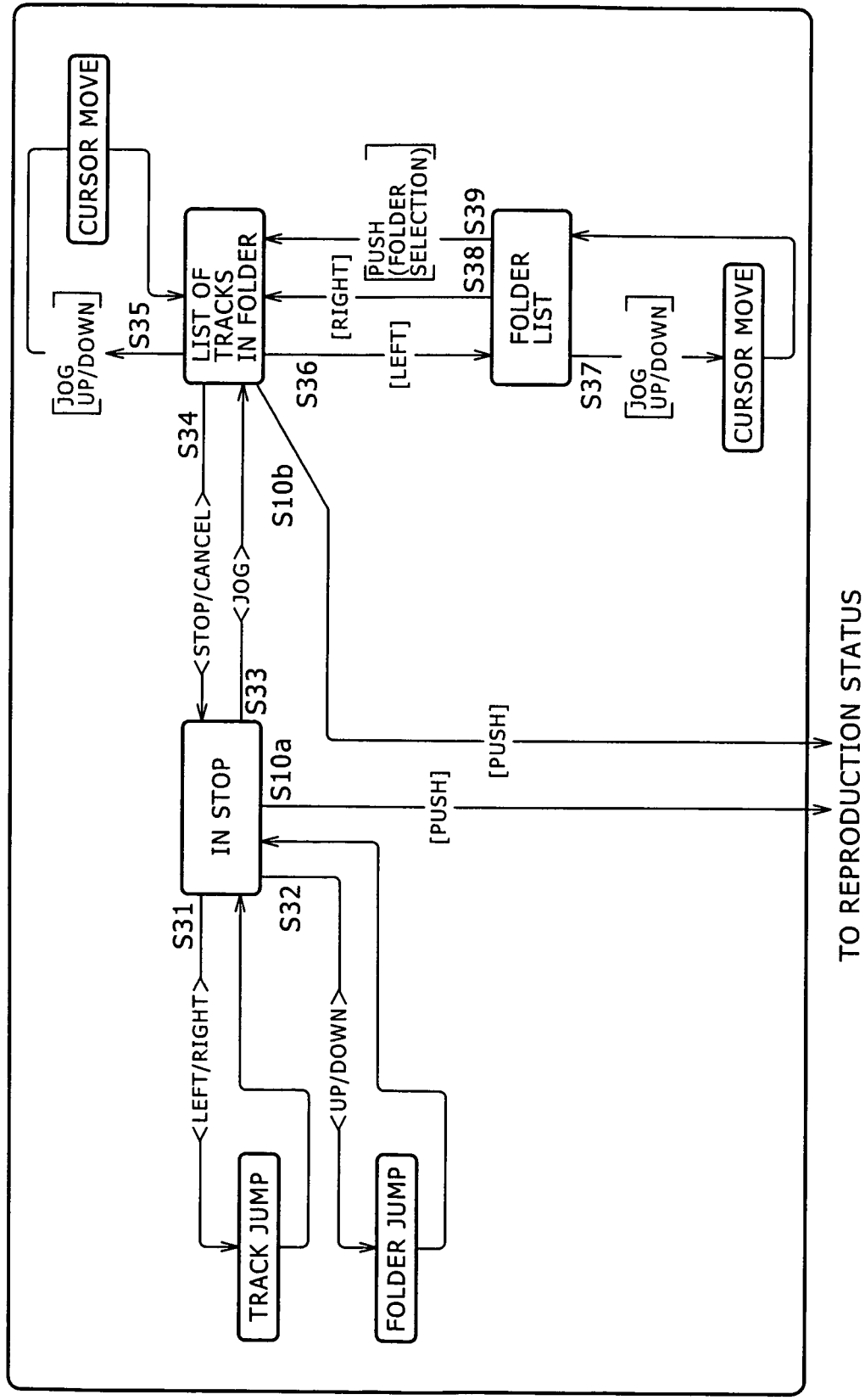
FIG. 7 is a diagram illustrating various operations to be executed in stop status of the above-mentioned embodiment.

Of the operation statuses described with reference to FIG. 5, operations to be executed by user in the stop status of the audio mode are shown in FIG. 7. FIG. 7 shows these user operations in S31 through S39.

In the stop status, there are "in stop", "list of tracks in holder", and "folder list" statuses.

These statuses are indicative that no audio reproduction operation is executed. "In stop" is a status in which normal display at the time of stop is made on the display block 4. "List of tracks in folder" is a status in which a list of tracks contained in currently selected audio data folder AG(x) is displayed. "Folder list" is a status in which a list of audio data folders AG1, AG2, and so on is displayed.

S31: Executing Left Push/Right Push Operation in Stop Status

If a left push/right push operation is executed in the stop status, the CPU 30 handles this operation as a track jump operation for a track being selected in a certain audio data folder. A left push operation causes a jump to a previous track, while a right push operation causes a jump to a next track. For example, a right push operation is executed when track TK1 is being selected in audio data folder AG1 shown in FIG. 6

(namely, if a reproducing operation starts with track TK1), a status is entered in which track TK2 is selected.

Therefore, in the stop status, the user is able to specify any track in the current audio data folder (or group) by executing a left or right push operation.

S32: Executing up Push/Down Push Operation in Stop Status

If an up push/down push operation is executed in the stop status, the CPU 30 handles this operation as an audio data folder move operation (or a folder jump operation). For example, an up push operation triggers a jump to a previous audio data folder and a down push operation triggers a next audio folder jump. For example, if the user executes an up push operation or a down push operation with audio data folder AG2 selected as shown in FIG. 6, a selected status may be switched to audio data folder AG1 or audio data folder AG3.

S33: Executing Jog Operation in Stop Status

If a jog operation is executed in the stop status, the CPU 30 switches the display status to the list of tracks in folder. For example, detecting the jog operation with audio data folder AG1 selected, the CPU 30 lists, on the display block 4, the names (or music titles) or track numbers of tracks TK1, TK2, and TK3 contained in audio data folder AG1.

S34: Executing Stop/Cancel Operation Form List of Tracks in Folder

If the stop/cancel key 7 is pressed when the list of tracks in folder is displayed, the CPU 30 determines this operation as the end of list display, returning the display on the display block 4 to the display in the stop status.

S35: Executing Jog Operation, Up Push Operation, Down Push Operation Form List of Tracks in Folder If a jog operation, an up push operation, or a down push operation is executed when the list of tracks in folder is displayed, the CPU 30 processes the operation as a cursor move operation, moving the cursor on the track list display. For example, the CPU 30 executes cursor move control on the display by moving the cursor in the direction of increasing track numbers in a jog clockwise operation, moving the cursor in the direction of decreasing track numbers in a jog counterclockwise operation, moving the cursor in the direction of decreasing track numbers in an up push operation, and moving the cursor in the direction of increasing track numbers in a down push operation.

S36: Executing Left Push Operation from List of Tracks in Folder

If a left push operation is executed when the list of tracks in folder is displayed, the CPU 30 switches the display status to folder list display. In this case, the CPU 30 causes the display block to execute displaying of a list of audio data folders AG1, AG2, and so on.

S37: Executing Jog Operation, Up Push Operation, or Down Push Operation from Folder List If a jog operation, an up push operation, or a down push operation is executed when a folder list is displayed, the CPU 30 processes this operation as a cursor move operation, moving the cursor on the folder list display. For example, the CPU 30 executes cursor move control on the folder list display by moving the cursor in the direction of increasing folder numbers in a jog clockwise operation, moving the cursor in the direction of decreasing folder numbers in a jog counterclockwise operation, moving the cursor in the direction of decreasing folder numbers in an up push operation, and moving the cursor in the direction of increasing folder numbers in a down push operation.

S38: Executing Right Push Operation from Folder List

If a right push operation is executed when a folder list is displayed, the CPU 30 returns the display status to the list of tracks in folder. This right push operation causes the returning of a screen that is paired with the above-mentioned left push operation of S36.

S39: Executing Push Operation form Folder List

If a push operation is executed when a folder list is displayed, the CPU 30 determines an audio data file selected by the cursor on the folder list screen at that moment as a selected folder, in this case. Then, the CPU 30 returns the display to the list of tracks in folder, in which the list of tracks in the selected audio data folder is displayed. For example, if audio data folder AG2 is selectively determined, the list of tracks TK4 and TK5 is displayed.

In the above description, the transition from the stop status to the reproduction status is made by a reproducing operation of S10 shown in FIG. 5 (or an operation of pushing the central controller 5); it should be noted that the reproducing operation of S10 shown in FIG. 5 is S10a or S10b shown in FIG. 7.

If a push operation is executed in the stop status in S10a, this push operation is regarded as a reproducing operation (or a push operation of the central controller 5) of S10, thereby making transition to the reproduction status. In this case, reproduction is made starting with the first track in the audio data folder AG1 selected at that moment.

If a push operation is executed when a list of tracks in folder is displayed as S10b, it is regarded as a reproducing operation of S10 to make transition to the reproduction status. In this case, at that moment, reproduction is made starting with a track selected by the cursor on the display.

7. Operations in Reproduction Status

Figure 8:
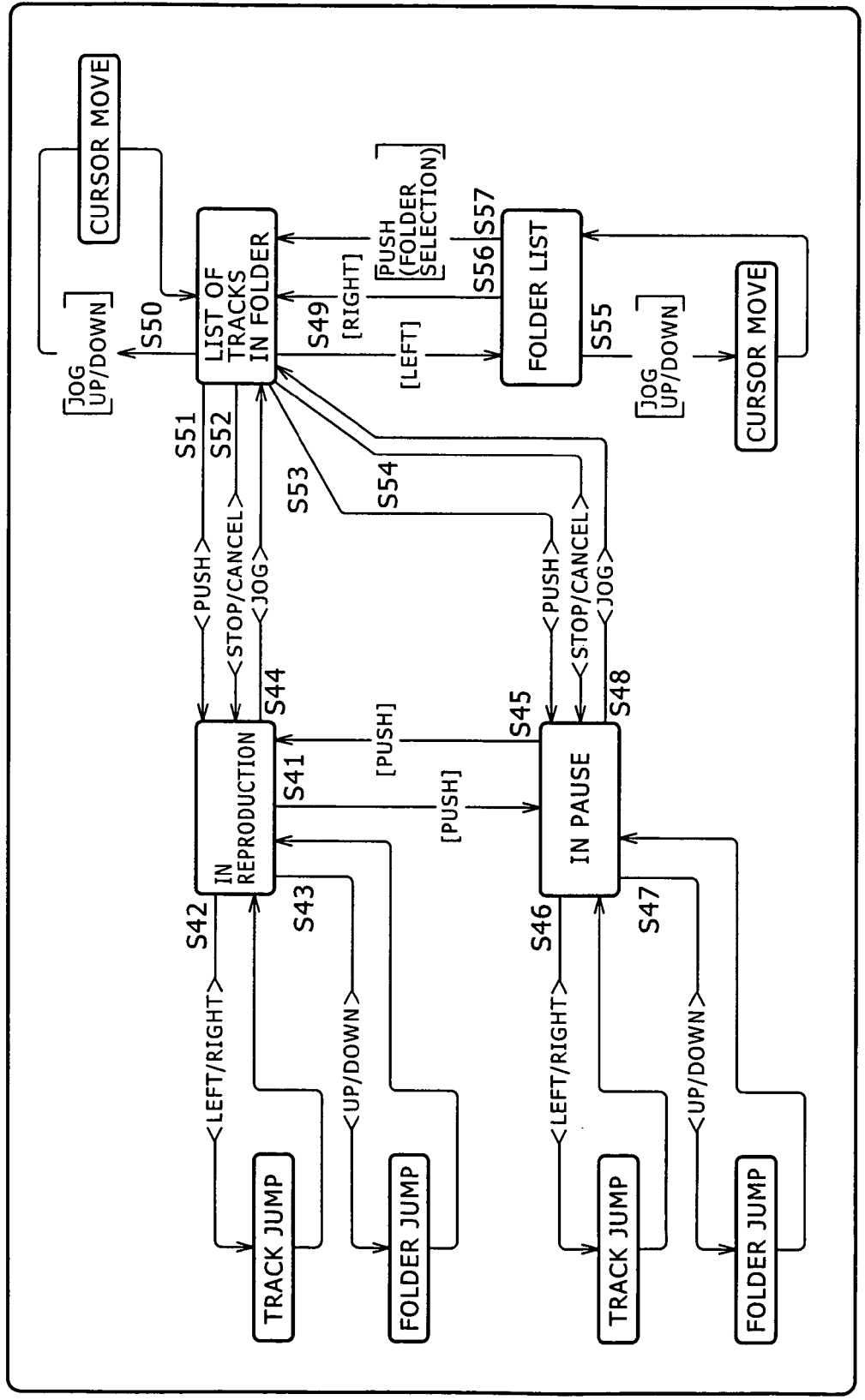
FIG. 8 is a diagram illustrating various operations in reproduction status of the above-mentioned embodiment.

The following describes operations to be executed in accordance with user operations in the reproduction status in the audio mode with reference to FIG. 8. FIG. 8 shows the operations according to user operations in S41 through S57.

In the reproduction status, there are "in reproduction", "in pause", "list of tracks in holder", and "folder list" statuses.

"In reproduction" is a status in which audio data (TK1 for example shown in FIG. 6) is being reproduced. "In pause" is a status in which the reproduction of audio data is paused. "List of tracks in folder" is a status in which tracks contained in currently selected audio data folder AG(x) are listed on the display block 4. "Folder list" is a status in which audio data folders AG1, AG2, and so on are listed on the display block. "List of tracks in folder" and "folder list" are statuses in which reproduction or pause is continued.

S41: Executing Push Operation in Reproduction

If a push operation is executed during reproduction, the CPU 30 pauses the reproducing operation (or the output of reproduced sound).

S42: Executing Left Push/Right Push Operation During Reproduction

If a left push or right push operation is executed during reproduction, the CPU 30 processes this operation as a track jump operation (in this case, a cue operation). In the case of a left push operation, the CPU 30 handles it as a reverse cue jump; in the case of a right push operation, the CPU 30 handles it as forward cue operation, thereby controlling the media drive block 34 and the memory interface 36 to execute cue reproduction.

Although not shown in FIG. 8, if a long left push or right push operation is executed during reproduction, the CPU 30 handles it as review reproduction operation or a cue reproduction operation and controls the media drive block 34 and the memory interface 36 to execute a fast reverse operation or fast reproduction.

S43: Executing Up Push Operation or Down Push Operation During Reproduction

If an up push operation or a down push operation is executed during reproduction, the CPU 30 processes it as an audio data folder move operation (or a folder jump operation). For example, in the case of an up push operation, jump is made to a previous data folder; in the case of a down push operation, jump is made to a next audio data folder.

In this case, the CPU 30 may control such that the selection of audio data folders is switched by an up push operation or a down push operation, thereby immediately executing reproduction audio output starting with the head track of a new audio data file. For an up push operation or a down push operation, the 30 may also control such that switching is made between audio data folder names on the display and, when a audio data folder is selected by an up push operation or a down push operation, the reproduction audio output is switched to that of the start track of the selected audio track folder.

S44: Executing Jog Operation During Reproduction

If a jog operation is executed during reproduction, the CPU 30 switches the display status to the list of tracks in folder. For example, detecting a jog operation during the reproduction of a certain track in audio data folder AG1, the CPU 30 displays a list of the names (or music titles) or track numbers of tracks TK1, TK2, and TK3 contained in audio data folder AG1, on the display block 4. It should be noted that the reproduction audio output is left continued.

S45: Executing Push Operation During Pause

If a push operation is executed in the pause status, the CPU 30 ends the pause status, thereby resuming the reproduction operation (or the reproduction audio output)

S46: Executing Left Push or Right Push Operation During Pause

If a left push or right push operation is executed in the pause status, the CPU 30 processes it as a track jump operation (in this case, a cue operation in the pause status). The CPU 30 causes the media drive block 34 to access a track head position as a reverse cue jump for a left push operation and a forward cue jump for a right push operation.

Although not shown in FIG. 8, if a left push operation or right-push operation is executed during pause, the CPU 30 handles it as fast reverse operation or fast feed operation and controls the media drive block 34 to execute a fast reverse operation or a fast forward operation.

S47: Executing Up Push Operation or Down Push Operation During Pause

If an up push operation or a down-push operation is executed in the pause status, the CPU 30 processes it as an audio data folder move operation (or a folder jump operation). For example, an up push operation triggers jump to a previous audio data folder and a down push operation triggers jump to next audio data folder. Then, the CPU 30 waits until the pause status is cleared (by a push operation) with the audio data folder selection switched. When the reproduction is resumed by a push operation, the reproduction starts with the head track in the audio data folder switched by the up push or down push operation.

S48: Executing Jog Operation During Pause

If a jog operation is executed in the pause status, the CPU 30 switches the display status to the list of tracks in folder. For example, detecting a jog operation during the pause of a track contained in audio data file AG1, the CPU 30 displays a list of names (or music titles) or track numbers of tracks TK1, TK2, and TK3 contained in that audio data folder AG1, on the display block 4. Alternatively, if a jog operation is executed after switching of audio data folders being selected by the up push or down push operation described above with reference to S47, a list of tracks contained in the switched audio data folder is displayed.

S49: Executing Left Push Operation from List of Tracks in Folder

If a left push operation is executed when a list of tracks in folder is displayed, the CPU 30 switch the display status to the folder list. In this case, the CPU 30 causes the display block to execute the list display of audio data folders AG1, AG2, and so on.

S50: Executing Jog Operation, Up Push Operation, or Down Push Operation from Lists of Tracks in Folder If a jog operation, an up push operation, or a down push operation is executed during the display of tracks in folder, the CPU 30 processes it as a cursor move operation, thereby moving the cursor on the track list display. For example, the CPU 30 executes cursor move control on the display by moving the cursor in the direction of increasing track numbers in a jog clockwise operation, moving the cursor in the direction of decreasing track numbers in a jog counterclockwise operation, moving the cursor in the direction of decreasing track numbers in an up push operation, and moving the cursor in the direction of increasing track numbers in a down push operation.

S51: Executing Push Operation from List of Tracks in Folder During Reproduction

If a push operation is executed after displaying a list of tracks in folder by a jog operation during reproduction, the CPU 30 determines it as a command for reproducing a track selected by the cursor on the display list, thereby controlling the media drive block 34 and the memory interface 36 to start reproduction of the selected track. The reproduction audio output is switched from that of the track so far reproduced to that of the newly selected track.

S52: Executing Stop/Cancel Operation from List of Tracks in Folder During Reproduction If the stop/cancel key 7 is pressed after displaying a list of tracks in folder by the jog operation during reproduction as above-mentioned S44, the CPU 30 determines it as an end of the list display, thereby returning the display of the display block 4 to the display status of in-reproduction. The reproduction audio output is left continued.

S53: Executing Push Operation form List of Tracks in Folder During Pause

If a push operation is executed, after displaying a list of tracks in folder by a jog operation during pause, the CPU 30 determines that the selected status of a track selected by the cursor on the list display has been determined, thereby continuing the pause status in which the reproduction of the newly selected track may be reproduced. The CPU 30 controls the media drive block 34 and the memory interface 36 so that the newly selected track is reproduced when the pause status is cleared.

S54: Executing Stop/Cancel Operation from List of Tracks in Folder During Pause

If the stop/cancel key 7 is pressed after executing the display of a list of tracks in folder by a jog operation during pause in above-mentioned S48, the CPU 30 determines it as the end of the list display, thereby returning the display on the display block 4 to the display of pause. The pause status is kept continued.

S55: Executing Jog Operation, Up Push Operation, or Down Push Operation from Folder List If a jog operation, an up push operation, or a down push operation is executed when a folder list is displayed, the CPU 30 processes it as a cursor move operation, thereby moving the cursors on the folder list display. For example, the CPU 30 executes cursor move control on the display by moving the cursor in the direction of increasing track numbers in a jog clockwise operation, moving the cursor in the direction of decreasing track numbers in a jog counterclockwise operation, moving the cursor in the direction of decreasing track numbers in an up push operation, and moving the cursor in the direction of increasing track numbers in a down push operation.

S56: Right Push Operation from Folder List

If a right push operation is executed when a folder list is displayed, the CPU 30 returns the display status to the list of tracks in folder. This right push operation is a screen returning operation paired with the left push operation shown in above-mentioned S49.

S57: Executing Push Operation from Folder List

If a push operation is executed when a folder list is displayed, the CPU 30 processes it as a folder selection enter operation. In this case, the CPU 30 determines the selected audio data folder on the folder list screen at the time by the cursor is as selected folder. Then, the CPU 30 returns the screen to the display of a list of tracks in folder; at this time, however, a list of tracks in the selectively entered audio data folder. For example, if audio data folder AG2 has been selectively entered, a list of tracks TK4 and TK5 is displayed.

8. Operation Example I in Photograph Viewing Status

The following describes operations in the photograph viewing status in the camera mode. It should be noted that various operation examples corresponding to jog operations will be described as operation examples I through III.

First, operation example I will be described with reference to FIGS. 9, 10, 11, and 12.

Figure 9:
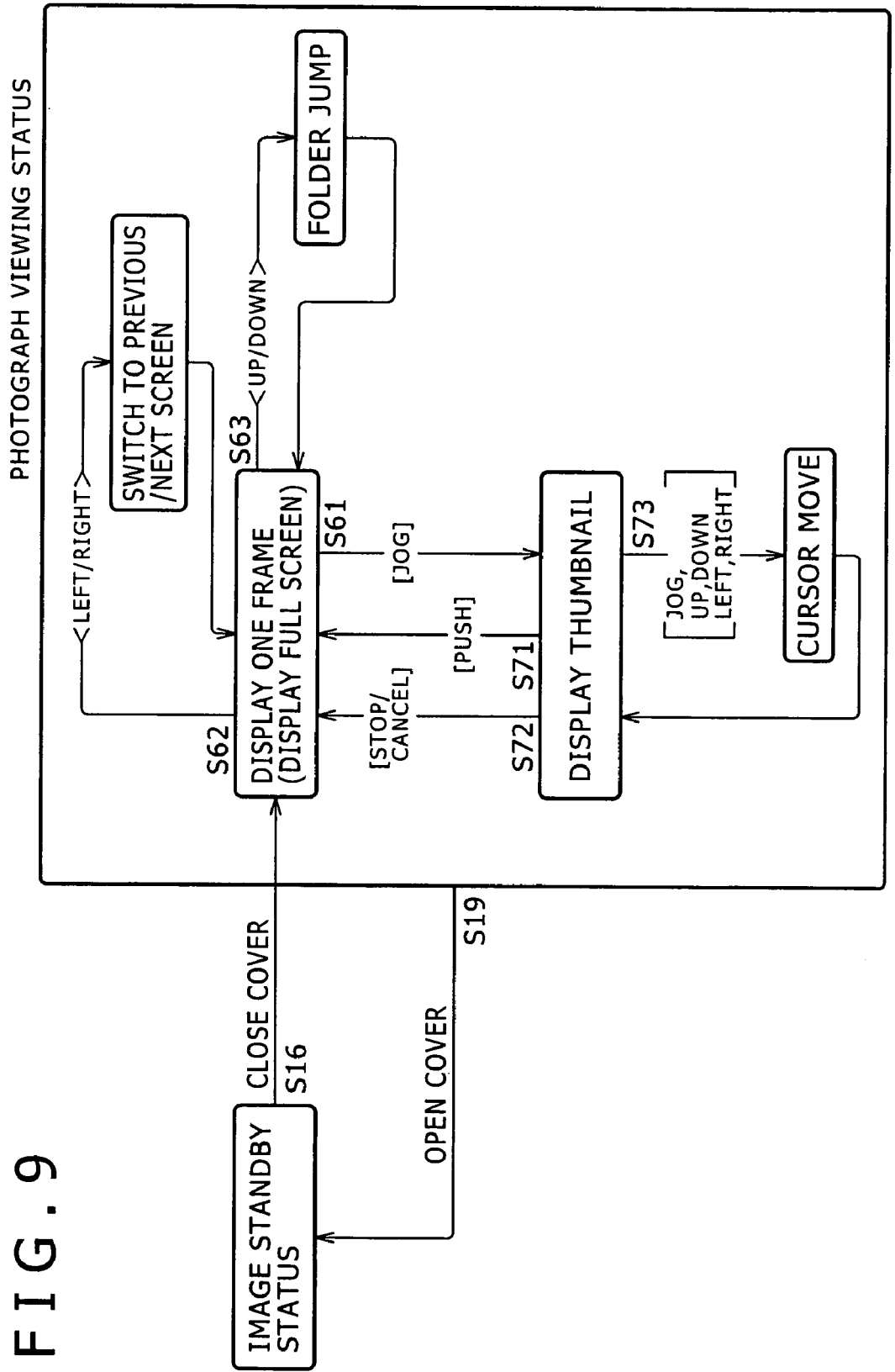
FIG. 9 is a diagram illustrating operation example I in photograph viewing status of the above-mentioned embodiment.

Now, referring to FIG. 9, there are shown operations corresponding to the photograph viewing status in S61, S62, S63, S71, S72, and S73.

The photograph viewing status includes "one frame display" and "thumbnail display" statuses as shown in FIG. 9.

Figure 10:
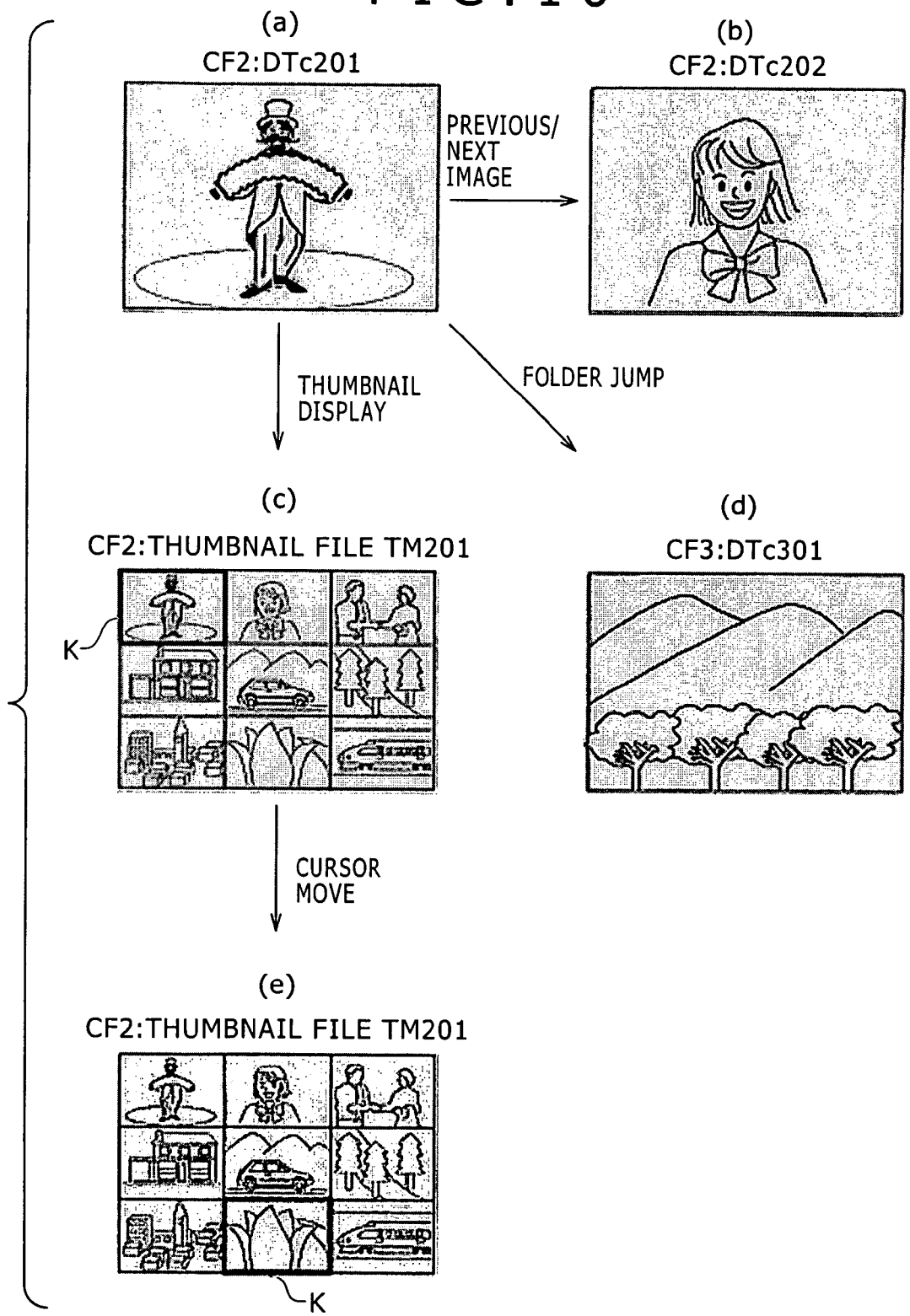
FIG. 10 is diagram illustrating display examples in photograph viewing statuses of the above-mentioned embodiment.

"One frame display" is a status in which one frame of imaged data is displayed in full screen on the display block 4. For example, (a) of FIG. 10 shows an image of imaged data DTc201 in image data folder CF2 shown in FIG. 6 in "one frame display" status.

"Thumbnail display" is a status in which thumbnail images representative of two or more pieces of imaged data are displayed on the display block 4. An example of this display status is shown in (c) of FIG. 10. In this example, the thumbnail images representative of nine images, DTc201 through DTc209, in image data folder CF2 are displayed. The image data for the thumbnail display is one read from thumbnail file TM201 in image data folder CF2, for example.

As described above with reference to S16 and S19 in FIG. 5, transition between the imaging standby status and the photograph viewing status is executed in accordance with opening and closing of the lens cover 15. When transition is made from the imaging standby status to the photograph viewing status in accordance with an operation for closing the lens cover 15 in S16, one frame display is executed in the photograph viewing status.

S61: Executing Jog Operation During One Frame Display

If a jog operation is executed during one frame display, the CPU 30 switches the display to the thumbnail display. Namely, the thumbnail image display is executed that uses a thumbnail file for example contained in an image data folder in which imaged data displayed at that time in one frame.

For example, if a push operation is executed when one frame display of imaged data DTc201 of image data folder CF2 is executed as shown in (a) of FIG. 10, the thumbnail display is executed as a reproduction image of thumbnail file TM201 contained in image data folder CF2 as shown in (c) of FIG. 10.

It should be noted that the above-mentioned operation is executed when a thumbnail file is generated in an image data folder as shown in FIG. 6; if no thumbnail file has been generated, thumbnail images may be extracted from imaged data DTc for display.

Meanwhile, if transition is made to the thumbnail display when one frame display of a certain piece of imaged data is displayed, a plurality of thumbnail images may be displayed with the imaged data in that one frame display as a start image or thumbnail images of image data from the start of an image data folder containing the imaged data of that one frame display may be displayed.

Also, the display of thumbnail images may be completed on an image data folder basis or the thumbnail images of the imaged data sequentially continuous with previous and next image data folders may be displayed regardless of the units of image data folders.

S62: Executing Left Push or Right Push Operation in One Frame Display

If a left push or right push operation is executed during one frame display, the CPU 30 switches between the previous and next image data to be displayed in one frame mode. A left push operation causes switching to the previous imaged data and a right push operation causes switching to the next imaged data. For example, as shown in (a) of FIG. 10, if a right push operation is executed when one frame display of imaged data DTc201 in image data folder CF2 is executed, the reproduction image of next imaged data DTc202 is displayed as shown in (b) of FIG. 10.

It should be noted that the previous and next imaged data may be completed within a image data folder or extended over image data folders. In the former, if a previous image is to be displayed by executing a left push operation when one frame display of imaged data DTc201 that is the first image in image data folder CF2 for example, the previous image may be the last imaged data in the image data folder CF2 in one cycle or, if no previous image data is found in image data folder CF2, no image switching many be executed (or the image switching may be invalided).

In the latter case, namely, if the previous and next imaged data extend over image data folders, a left push operation with one frame display of first imaged data DTc201 of image data folder CF2 executed causes the previous image to become the last imaged data of the previous image data folder CF1.

S63: Executing Up Push or Down Push Operation During One Frame Display

If an up push operation or a down push operation is executed during one frame display, the CPU 30 executes folder jump to switch between images to be displayed. For example, an up push operation causes jump to the previous image data folder and a down push operation causes jump to the next image data folder.

For example, if a down push operation is executed when one frame display of imaged data in image data folder CF2, such as image data DTc201 for example shown in (a) of FIG. 10, the CPU 30 executes jump to next image data folder CF3, thereby executing control such that the reproduction image of start imaged data DTc301 in the image data folder is displayed in one frame as shown in (d) of FIG. 10.

Likewise, if an up push operation is executed when one frame display of the imaged data in image data folder CF2, such as imaged data DTc201 as shown in (a) of FIG. 10 for example is executed, the CPU 30 executes jump to previous image data folder CF1, thereby executing control such that the reproduction image of start imaged data DTc101 of image data folder CF1 is displayed in one frame.

S71: Executing Push Operation During Thumbnail Display

If a push operation is executed during thumbnail display, the CPU 30 executes switching from the thumbnail display to the one frame display. In the thumbnail display, one of a plurality of images is selected by the cursor K as shown in (c) and (e) of FIG. 10 for example. If a push operation is executed during the thumbnail display, switching is made to the one frame display of the image selected by cursor K at that moment. For example, if imaged data DTc201 is selected by cursor K in (c) of FIG. 10, switching is made to the one frame display of imaged data DTc201 as shown in (a) of FIG. 10. If the image selected by cursor K is imaged data DTc208 in (e) of FIG. 10 for example, switching is made to the one frame display of DTc208.

S72: Executing Stop/Cancel Operation During Thumbnail Display

If the stop/cancel key 7 is operated during the thumbnail display, the CPU 30 executes switching from the thumbnail display to the one frame display. However, in this case, the selection by cursor K on the thumbnail screen is canceled, so that display returns to the one frame display at it was before moving to the thumbnail display. For example, with cursor K positioned at imaged data DTc208 as shown in (e) of FIG. 10 after switching from the one frame display of imaged data DTc201 to the thumbnail display shown in (c) of FIG. 10, operating the stop/cancel key 7 causes the original one frame display shown in (a) of FIG. 10 to be resumed.

S73: Executing Jog, Up Push, Down Push, Left Push, or Right Push Operation During Thumbnail Display If one of job, up push, down push, left push, and right push operations is executed during the thumbnail display, the CPU 30 processes it as a cursor move operation on the thumbnail display. For example, a clockwise jog operation causes cursor K move control on the display, thereby moving cursor K in the forward direction of nine thumbnail images for example as shown in (c) and (e) of FIG. 10, a counterclockwise jog operation causes moves cursor K in the reverse direction of the thumbnail images, an up jog operation causes cursor K to move up, a down jog operation causes cursor K to move down, a left jog operation causes cursor K to move left, and a right jog operation causes cursor K to move right. It should be noted that, in (c) and (e) of FIG. 10, the number of images shown in thumbnail display is nine; obviously, if there are ten or more images as imaged data DTc, ten or more thumbnail images are switched one after the other by cursor K.

Figure 11:
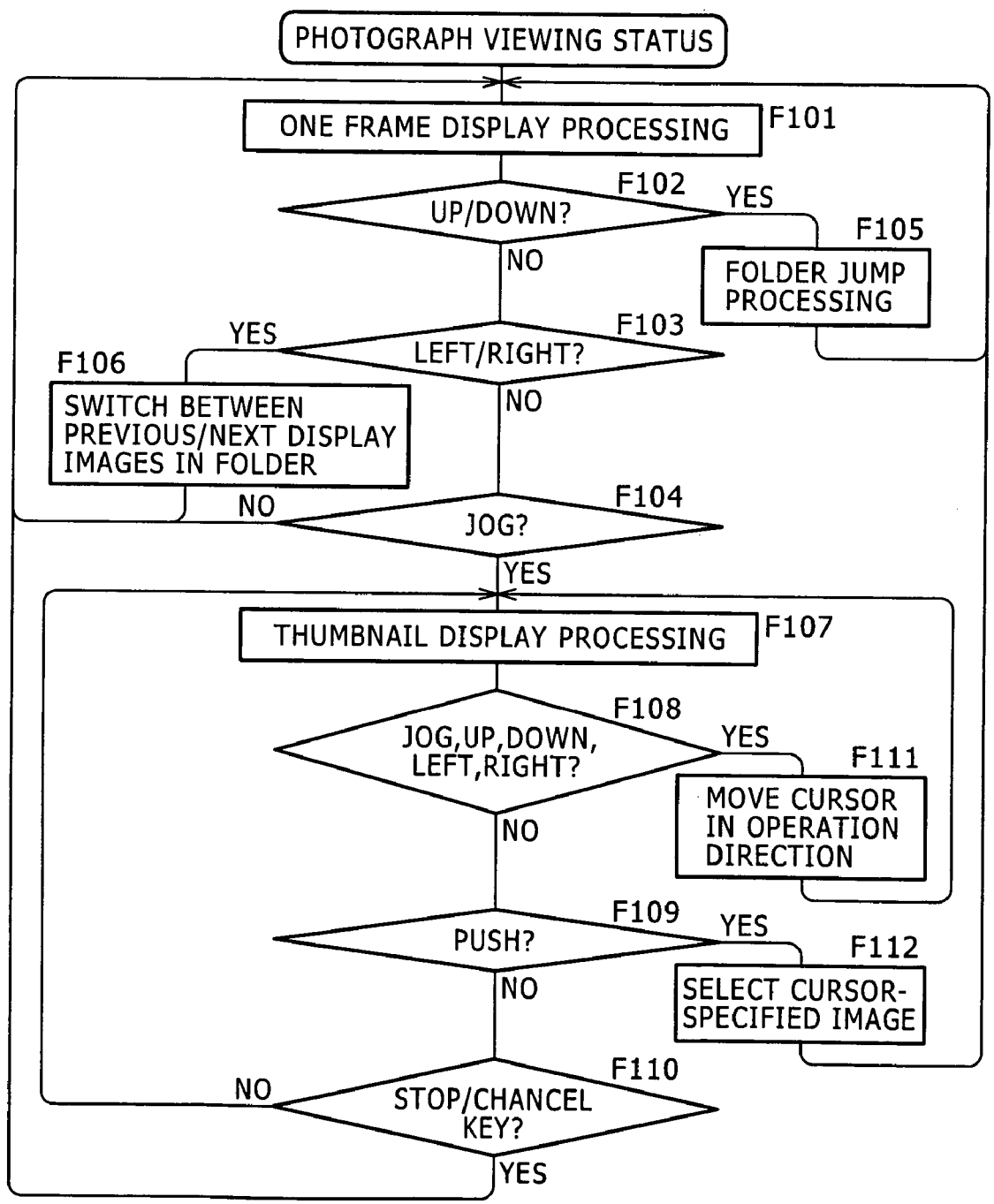
FIG. 11 is a flowchart indicative of processing of operation example I of the above-mentioned embodiment.

FIG. 11 shows the processing by the CPU 30 for realizing the operation shown in FIG. 9. It should be noted that FIG. 11 illustrates the processing of only the operation in the photograph viewing status described above with reference to FIG. 9. For example, the processing of making transition to the imaging standby status is skipped.

Step F101 is indicative of the processing for displaying a certain piece of imaged data as one frame display. The CPU 30 monitors an up push operation, a down push operation, a left push operation, a right push operation, and a jog operation in steps F102, F103, and F104 with respect to this one frame display.

If an up push operation or a down push operation is detected, the CPU 30 goes from step F102 to step F105, in which the CPU 30 switches the selection of an image to be displayed in one display mode by use of the folder jump processing described above with reference to S63. Then, the CPU 30 returns to step F101 to display the image of the imaged data newly selected by the folder jump.

If a left push operation or a right push operation is detected, the CPU 30 goes from step S103 to step F106, in which the CPU 30 executes switching to the previous or next imaged data described above with reference to S62. Then, the CPU 30 returns to step F101 to execute one frame display of the previous or next imaged data.

If a jog operation is detected, the CPU 30 goes from step S104 to step F107, in which the CPU 30 executes the thumbnail display as described above with reference to S61.

During the thumbnail display, the CPU 30 monitors each of cursor move operations (jog, up push, down push, left push, and right push) and an operation of the stop/cancel key 7 in steps F108, F109, and F110.

If any of the cursor move operations (jog, up push, down push, left push, and right push) is detected, the processing shown above with reference to S73 is executed. Namely, the CPU 30 goes step F108 to step F111, in which the CPU 30 moves cursor K in the direction corresponding to the detected operation on the thumbnail display (as required, the CPU 30 executes thumbnail image switching or scroll processing).

If a push operation is detected, the CPU 30 goes from step F109 to step F112 to execute the processing described with reference to S71, in which the selection of the imaged data selected by cursor K at that moment is entered. Then, the CPU 30 goes to step F101 to execute one frame display of the imaged data selected by cursor K.

If an operation of the stop/cancel key 7 is detected, the CPU 30 goes from step F110 to F101 as the processing described above with reference to S72, thereby resuming the one frame display of the imaged data as it was before transition was made to the thumbnail display.

In operation example I described above, the user is able to continuously displaying the one frame display and then the thumbnail display and moving the cursor (for image selection) on that thumbnail image by executing jog operations.

Namely, if a jog operation is detected in step F104, the CPU 30 executes the thumbnail display in step F107. If a jog operation is detected again, the CPU 30 goes from step F108 to step F111, thereby executing a cursor move operation.

Figure 12:
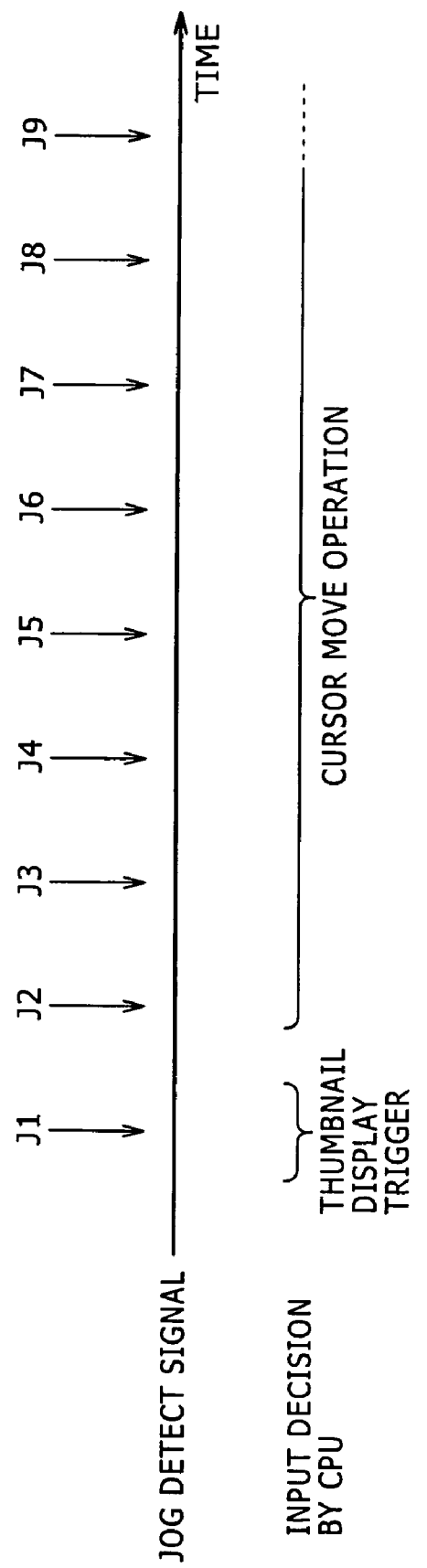
FIG. 12 is a diagram illustrating operation example I in photograph viewing status of the above-mentioned embodiment.

FIG. 12 shows an input decision to be made by the CPU 30 in response to the detection of a jog operation.

A jog operation is executed by user's rotating the external periphery (or a jog dial) of the central controller 5. If 14 clicks are set to one rotation of the jog dial for example, 14 operation signals are generated when a full one rotation of the jog dial is made. In this case, every time the jog dial is rotated by approximately 26 degrees, a jog operation signal is entered in the CPU 30. These jog operation signals are indicated by J1, J2, J3, and so on in FIG. 12. (It should be noted that, although the jog dial is used as means of executing jog operation, the jog operation can be executed by other means such as a touch panel.)

If jog operation signal J1 is detected, the CPU 30 determines detected jog operation signal J1 as a trigger for the thumbnail display and goes from step F104 to step F107.

If jog operation signals J2, J3, and so on are sequentially detected, the CPU 30 determines that the detected jog operation signals are triggers for cursor move operations on the thumbnail display, thereby executing cursor move processing in step F111 accordingly.

Thus, the user, by displaying thumbnail images, is able to continuously move cursors on the thumbnail images only by execution jog operations.

9. Operation Example II in Photograph Viewing Status

Figure 13:
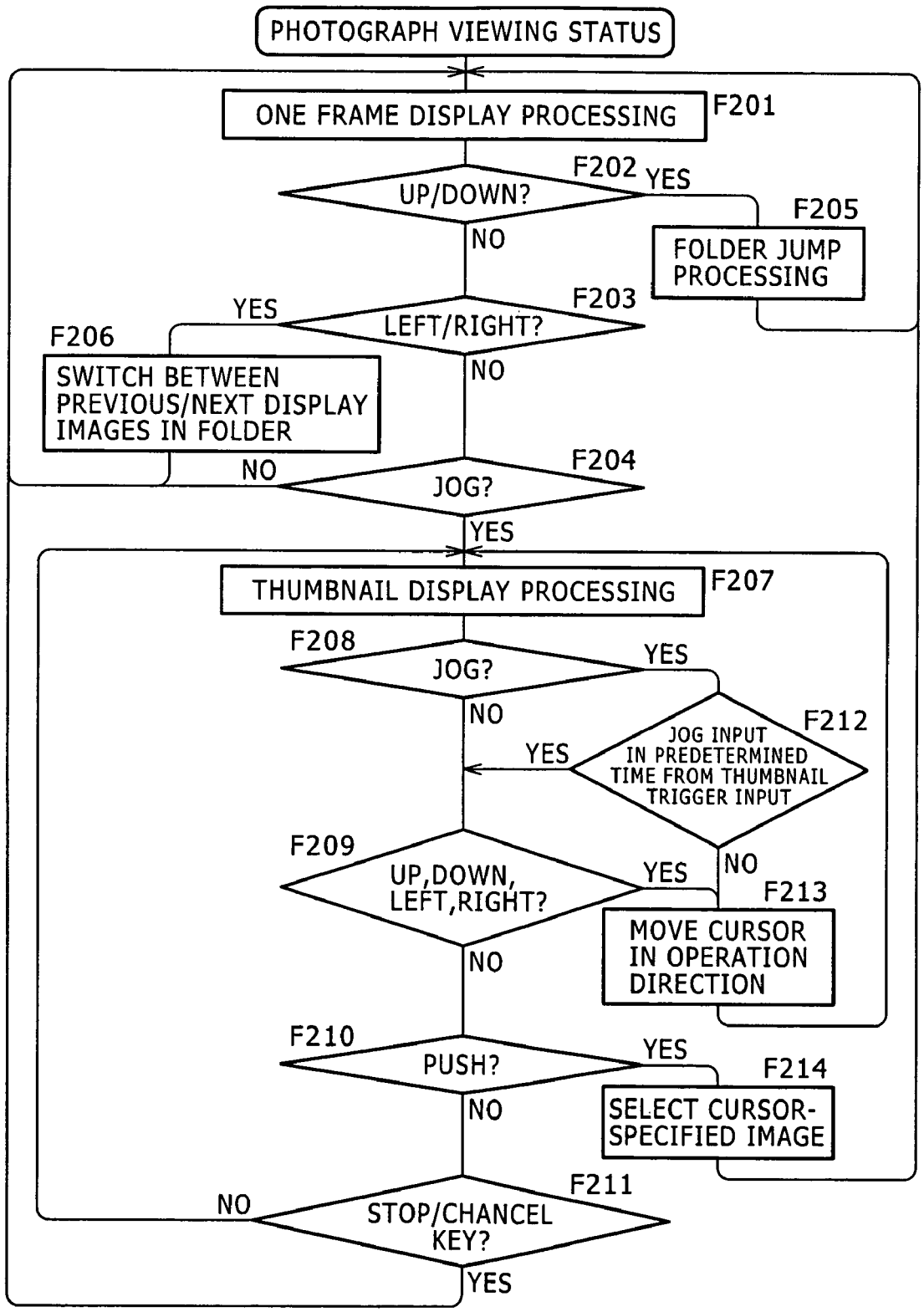
FIG. 13 is a flowchart indicative of processing of operation example II in photograph viewing status of the above-mentioned embodiment.
Figure 14:
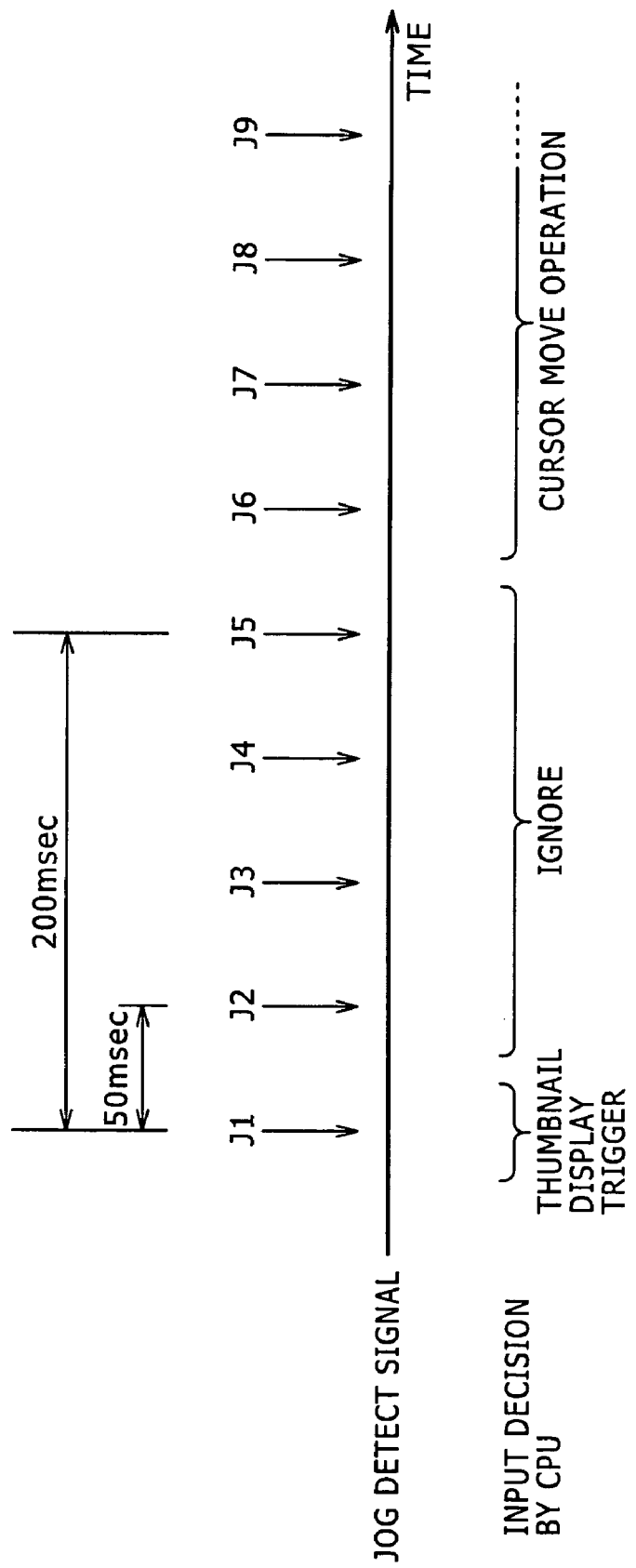
FIG. 14 is a diagram illustrating operation example II in photograph viewing status of the above-mentioned embodiment.

The following describes operation example II with reference to FIGS. 13 and 14. The operation transitions in the photograph viewing status are the same as those described above with reference to FIG. 9. In operation example I above, if the CPU 30 determines that a jog operation signal has been detected as shown in FIG. 12, it may sometimes occur that the user feels it difficult to execute a cursor operation. For example, if the jog is quickly rotated during one frame display, the CPU 30 processes the jog operation signal J1 shown in FIG. 12 as a trigger for thumbnail display and then recognizes subsequent continuously detected jog operation signals J2, J3, and so on each as one cursor move operation, thereby executing cursor move processing. Namely, if the user quickly and largely rotates the jog dial, the cursor enters a status on the thumbnail display in which the cursor moves some distance for the user. However, this status sometimes makes the user feel inconvenient when moving the cursor sequentially from the start thumbnail image on the thumbnail display.

For example, the above-mentioned processing for operation example I will not present any such problem if the rotation of the jog dial is clicked when the dial is rotate, in which the user is able to clearly recognize a trigger at the first click and cursor movements at second and subsequent clicks for example. The above-mentioned inconvenience is especially conspicuous with a jog dial that is rotated without click.

To overcome this inconvenience, in operation example II, a dead zone is arranged in which the jog operation signals detected subsequent to jog operation signal J1 triggering thumbnail display are ignored. FIG. 14 shows this dead zone.

For example, the dead zone is 200 msec immediately after the trigger signal for thumbnail display. If jog operation signals are detected every 50 msec for example generated by user jog operations, then jog operation signals J2 through J5 shown in FIG. 14 shown in FIG. 14 provide the jog operation signals within 200 msec after the detection of the jog operation signal J1.

In this case, the CPU 30 determines the first jog operation signal J1 as a trigger for thumbnail display and ignores the subsequent jog operation signals J2 through J5.

When 200 msec has passed, the jog operation signals J6 and on are determined as cursor move operations.

The processing by the CPU 30 is as shown in FIG. 13. It should be noted that steps F201 through F206 are generally the same as steps F101 through F106 shown in FIG. 11 and therefore the description thereof will be skipped.

If a jog operation is detected during one frame display, the CPU 30 goes from step F204 to step F207 to execute thumbnail display.

During the thumbnail display, the CPU 30 checks for a jog operation signal in step F208 and checks for an up push operation, a down push operation, a left push operation, or a right push operation in step F209. In step F210, the CPU 30 checks for a push operation. In step S211, the CPU 30 checks for an operation of the stop/cancel key 7.

If a push operation is detected in step F210, then the CPU 30 goes to step F214 to enter the selection of imaged data selected by cursor K at that moment. Then, the CPU 30 goes to step F201 to execute one frame display of the selected imaged data. These operations are the same as described above with reference to FIG. 11. If an operation of the stop/cancel key 7 is detected, the CPU 30 goes from step F211 to step F201, thereby resuming the one frame display of imaged data as it was before the thumbnail display.

If an operation other than a jog operation is detected as a cursor move operation, such as an up push operation, a down push operation, a left push operation, or a right push operation, the CPU 30 goes from step F209 to step F213, thereby moving cursor K in the direction corresponding to the detected operation on the thumbnail display.

If a jog operation that is a cursor move operation as described above is detected in step F208, the CPU 30 goes to step F212 to determine whether or not the detected operation is a jog operation input within a predetermined time from the jog operation input (namely, the jog operation detected in step F204) that triggers thumbnail display. A predetermined time is 200 msec shown in FIG. 14 for example.

If the detected jog operation is found within a predetermined time, the CPU 30 goes from F212 to F209. Namely, that jog operation is handled as ignored.

On the other hand, if the detected jog operation is found outside the predetermined time, then the CPU 30 goes from step F212 to step F213, to move cursor K in the direction according to that job operation as an effective cursor move operation.

The above-mentioned processing allows an operation that invalidates a jog operation for a predetermined time at the time of transition to thumbnail display by a jog operation.

10. Operation Example III in Photograph Viewing Status

Figure 15:
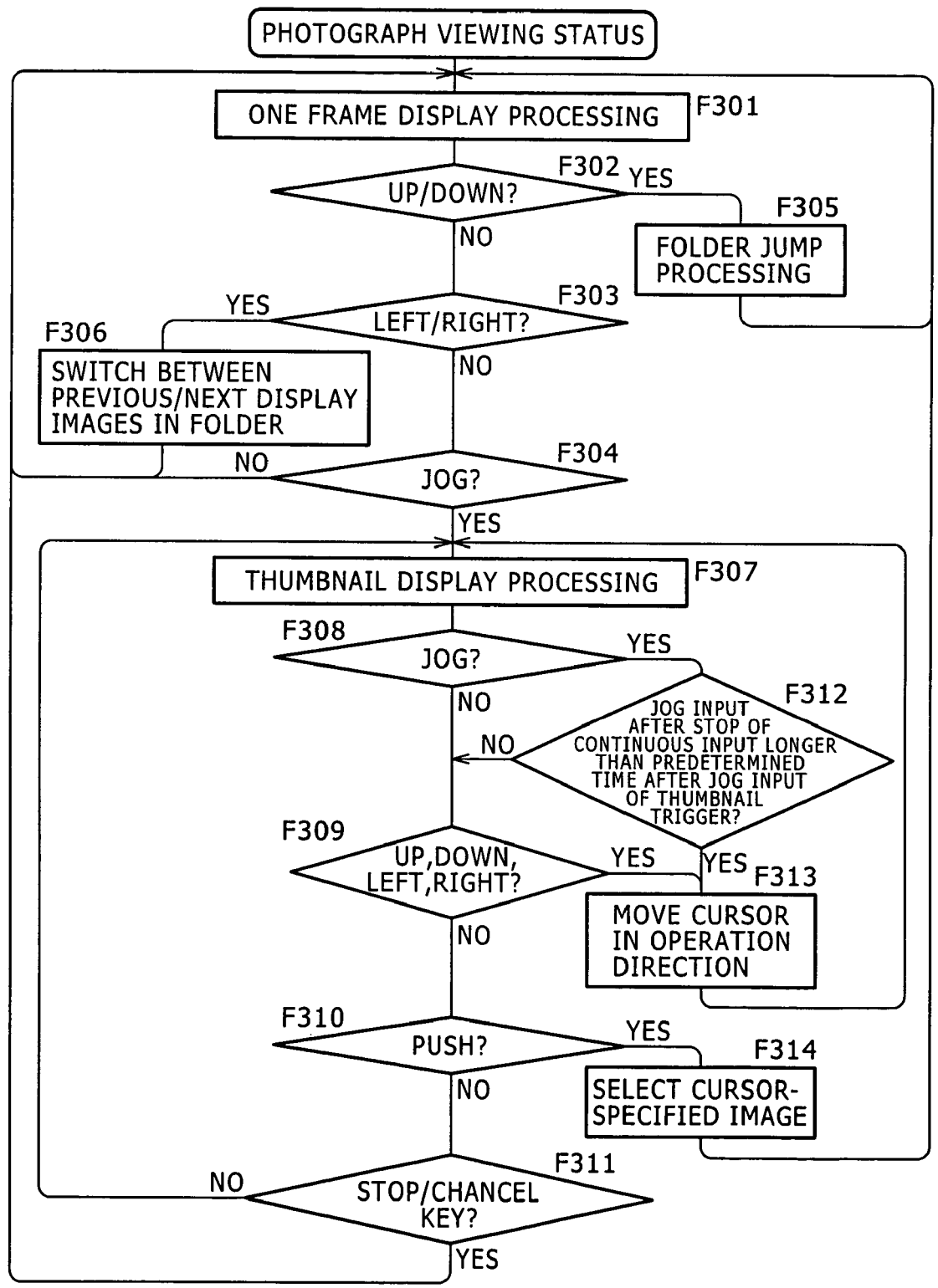
FIG. 15 is a flowchart indicative of processing of operation example III in photograph viewing status of the above-mentioned embodiment.

The following describes operation example III with reference to FIGS. 15 and 16. Operation transitions in the photograph viewing status are the same as describe above with reference to FIG. 9. Like above-mentioned operation example II, operation example III is intended to facilitates cursor move operations.

In this case, jog operation signals J2 and J3 that are detected after jog operation signal J1 triggering thumbnail display as shown in FIG. 16 are ignored. If a job operation is executed after a period in which no jog operation is detected for 150 msec or longer, the executed jog operation is determined to be a cursor move operation. In the case of FIG. 14, operation signals subsequent to jog operation signal J4 are regarded as cursor move operations.

The period of 150 msec or longer in which no jog operation is detected is equivalent to a period in which the user stops rotating the jog dial. Namely, the first jog dial rotation is a trigger for thumbnail display and a jog dial rotation after stopping of the jog dial by the user is a cursor move operation.

The processing by the CPU 30 is as shown in FIG. 15. It should be noted that steps F301 through F306 are generally the same as steps F101 through F106 shown in FIG. 11 and therefore the description thereof will be skipped.

If a jog operation is detected during one frame display, the CPU 30 goes from step F304 to step F307 to execute thumbnail display.

During thumbnail display, the CPU 30 checks for a jog operation in step F308. In step S309, the CPU 30 checks for an up push operation, a down push operation, a left push operation, or a right push operation. In step F310, the CPU 30 checks for a push operation. In step F311, the CPU 30 checks for an operation of the stop/cancel key 7.

If a push operation is detected in step S310, then the CPU 30 goes to step F314 to enter the selection of the imaged data selected by cursor K at that moment. Then, in step S301, the CPU 30 executes one frame display of the imaged data selected by cursor K, which is the same as the processing described above with reference to FIG. 11. If an operation of the stop/cancel key 7 is detected, the CPU 30 goes from step F311 to step F301 to resume the one frame display of the image data as it was before the transition to the thumbnail display, which is also the same as the processing described above with reference to FIG. 11.

If an operation other than a jog operation is detected as a cursor move operation, such as an up push operation, a down push operation, a left push operation, or a right push operation, then the CPU 30 goes from step F309 to step F313, thereby moving cursor K in the direction corresponding to the detected operation on the thumbnail display.

If jog operation is detected in step F308 as a cursor move operation, the CPU 30 goes to step F312 to determine whether or not the detected jog operation is of a jog operation signal that is after a period in which no jog operation signal has been detected for longer than a predetermined time after a jog operation input (namely, the jog operation detected in step F204) for triggering the thumbnail display. The predetermined time is 150 msec shown in FIG. 16, for example.

If the detected jog operation is of a jog operation signal as it was before a no-entry period longer than a predetermined time is caused (for example, jog operation signals J2 and J3 shown in FIG. 16), then the CPU 30 goes to from step F312 to step F309. Namely, that jog operation is handled as invalid.

On the other hand, if the detected jog operation is of a jog operation signal as it is after a period in which no jog operation has been entered for longer than a predetermined time (for example, jog operation signals J4, J5, and so on shown in FIG. 16), the CPU 30 goes from step F312 to step F313, thereby moving cursor K in the direction corresponding to the detected jog operation as a valid cursor move operation.

The above-mentioned processing allows the execution of an operation that is a valid jog operation as a cursor move operation to be executed after a period in which no jog operation is executed for longer than a predetermined time at transition to the thumbnail display by a jog operation.

11. Effects of and Variations to the Embodiment

The audio player and camera combined apparatus of the present embodiment described above is able to make switching to thumbnail display by executing a jog operation when image data recorded to the disc 90 is displayed in the one frame display mode and, by continuing the jog operation, execute cursor move processing on the thumbnail display. Namely, the user is able to execute switching to the list image display based on thumbnail images and image selection (or cursor movement) on the list image display by a single operation means (namely, the jog dial of the central controller 5). The configuration makes it very easy for the user to execute an operation for search for desired images.

As described with reference to FIGS. 7 and 8, a jog operation triggers the list display of tracks in the audio mode (S33, S44, S48) and, at the same time, provides cursor movement on this list display of tracks (S35, S50).

Hence, a jog operation functions in generally the same way in both the audio mode and camera mode, thereby making it easier for the user to understand operational functions, resulting in significantly reduced operator load. Also, the shared jog operation (or the jog dial) between the camera mode and the audio mode as described above reduces the number of controls for a combined function device, which does not involve the complexity in operation, thereby making the present embodiment preferable for a small-size portable device.

In addition, as described as operation example II, when a jog operation is detected with image data displayed in one frame display mode and thumbnail display is executed, the CPU 30 handles the jog operation as a cursor move operation a certain period of time after the jog operation triggering the thumbnail display.

As described as operation example III, if a jog operation is detected when image data is displayed in one frame display mode and thumbnail display is executed, the CPU 30 handles the jog operation as a cursor move operation after a period in which no operation has been detected longer than a predetermined time for the jog operation.

The above-mentioned configurations prevent any cursor movement unexpected by the user, thereby enhancing the ease of use. For example, the above-mentioned novel configurations prevent a situation in which the jog dial is rotated too much, thereby moving the cursor upon switching to thumbnail display.

It should be noted that operation examples I through III in the present embodiment have been described by use of jog operations in the camera mode. It is also practicable to apply the dead zone of jog operation as with operation examples II and III to the processing in the audio mode. Namely, a jog operation as a cursor movement may be determined with the dead zone from a jog operation triggering track list display.

The form of cursor K may be other than that shown in FIG. 10 in which a box-shaped cursor is used. Namely, the form of cursor may be underscore, highlight, blink, or any other as far as a selected status may be indicated.

The jog operation by the jog dial of the central controller 5 has been described above. Alternatively, an independent jog dial, a track ball, a shuttle control, or an enter key not based on rotary control may also be used as a control for triggering list display and moving selected display.

For the embodiment of the invention, an example of the audio player and camera combined apparatus is used herein. However, the present invention is also applicable to devices having a recording capability as one of audio capabilities. Further, the present invention is applicable to camera devices without audio capabilities.

Besides, in addition to camera devices, the present invention is applicable to a variety of image reproduction devices capable of executing list display by executing image reproduction.

In the present embodiment, the disc 90 based on mini disc for example is used as a recording medium for recording audio data and image data. The recording medium for use in the present embodiment may also be other optical discs such as CD (Compact Disc), DVD (Digital Versatile Disc), and Blu-Ray Disc), for example. In addition, various other types of recording media may be used, such as magnetic disc media including HDD (Hard Disc Drive), solid state memories including flash memory, memory card containing solid state memory, and magnetic tape media.

Moreover, a configuration is also practicable in which a recording medium for recording audio data and a recording medium for recording image data are separately arranged in the audio player and camera combined apparatus.

While preferred embodiments of the present invention have been described using specific terms, such description is for illustrative purpose only, and it is to be understood that changes and variations may be made without departing from the spirit or scope of the following claims.

What is claimed is:

1. A display control method for reproducing image data from a recording medium and displaying said image data onto display means, the method comprising the steps of:

detecting a first operation of operation means for giving a command for switching a display status in said display means from a display status in which one frame of image is displayed to a display status in which a list of images is displayed;

executing list image display by said display means in response to detection of said first operation of said operation means when one piece of image data reproduced from said recording medium is displayed by said display means;

ignoring detection of a second operation of said operation means, said second operation occurring after said first operation; and moving a selection display on said list image display in response to the detection of a third operation of said operation means after said second operation when said list image display is executed by said display means;

wherein operation of said selection display moving step is executed if said third operation of said operation means is detected after a first period in which no operation has been detected for longer than a predetermined time for said operation means after the detection of an said second operation of said operation means, said second operation of said operating means detected during a second period in which no operation has been detected for shorter than the predetermined time for said operation means after the detection of a first operation of said operation means for executing said list image display step.

* * * * *